United States Patent
Marcus et al.

(10) Patent No.: US 6,724,487 B2
(45) Date of Patent: *Apr. 20, 2004

(54) APPARATUS AND METHOD FOR MEASURING DIGITAL IMAGER, PACKAGE AND WAFER BOW AND DEVIATION FROM FLATNESS

(75) Inventors: Michael A. Marcus, Honeoye Falls, NY (US); Thomas F. Kaltenbach, Webster, NY (US); Duane M. Courtney, Webster, NY (US); Jiann-Rong Lee, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/163,519

(22) Filed: Jun. 6, 2002

(65) Prior Publication Data

US 2003/0227632 A1 Dec. 11, 2003

(51) Int. Cl.[7] .................................................. G01B 9/02
(52) U.S. Cl. ...................................... 356/497; 356/479
(58) Field of Search ................................ 356/477, 479, 356/482, 497, 498, 501, 511, 512, 516

(56) References Cited

U.S. PATENT DOCUMENTS

| | | | |
|---|---|---|---|
| 3,319,515 A | 5/1967 | Flournoy | |
| 4,418,284 A | * 11/1983 | Ogawa et al. | 250/208.1 |
| 4,955,719 A | 9/1990 | Hayes | |
| 5,402,234 A | 3/1995 | Deck | |
| 5,446,547 A | 8/1995 | Guenther et al. | |
| 5,596,409 A | 1/1997 | Marcus et al. | |
| 5,633,712 A | 5/1997 | Venkatesh et al. | |
| 6,288,784 B1 | * 9/2001 | Hitzenberger et al. | 356/485 |
| 6,321,594 B1 | 11/2001 | Brown et al. | |
| 6,323,952 B1 | 11/2001 | Yomoto et al. | |
| 6,614,534 B1 | * 9/2003 | Marcus et al. | 356/503 |

OTHER PUBLICATIONS

U.S. Ser. No. 09/460,280 filed Dec. 14, 1999 by Marcus et al.

U.S. Ser. No. 09/521,089 filed Mar. 7, 2000 by Marcus et al.

* cited by examiner

*Primary Examiner*—Samuel A. Turner
*Assistant Examiner*—Michael A. Lyons
(74) *Attorney, Agent, or Firm*—Roland R. Schindler, II

(57) ABSTRACT

Apparatus for measuring the surface profile of a sample, includes a fixture for locating a surface of a transparent optical flat relative to a surface of a sample; a low-coherence light interferometer having an optical probe coupled to an XY scanning frame for scanning the surface of the sample through the transparent optical flat to produce interferometric data signals representing the distances between the optical flat surface and the surface of the sample; and a computer system responsive to the interferometric data signals for generating a surface profile of the sample using a best fit to a plane.

41 Claims, 19 Drawing Sheets

APPARATUS AND METHOD FOR MEASURING DIGITAL IMAGER, PACKAGE AND WAFER BOW AND DEVIATION FROM FLATNESS

FIELD OF THE INVENTION

The present invention relates to optical reflectometry, and more particularly to a method and apparatus for measuring the surface geometry of an image sensor mounted in its package.

BACKGROUND OF THE INVENTION

In many applications for digital imagers there is a need to obtain a high degree of flatness. There is a need for an improved method of assessing the flatness of such digital imagers. In digital Single Lens Reflex (SLR) cameras there is a need to maintain a high degree of flatness of the imager plane so that the camera can be accurately focused. It is important that the flatness of the packaged imager be accurately measured so that the focus capability of the imager can be assessed. In the case of digital imagers for digital radiography applications, scintillating fiber optic faceplates are usually placed in contact with and attached to the surface of the digital imager. There is a requirement that the maximum gap between the fiber optic faceplate and the digital imager be small. It is important to know the surface profile of the imager surface so that the fiber optic faceplates can be ground to match the surface of the imager to tight tolerances. In particular it is desired to calculate the best-fit spherical surface equivalent for the imager surface and grind the fiber optic faceplates to the same sphere and maintain this tight tolerance. A better solution is to assemble the digital imager so that it is flat enough to directly mate to a flat surface of a ground fiber optic faceplate. In order to be able to get to the required levels of flatness, an assessment of the flatness of the package, imager chips and imager gluing process also needs to be understood.

Prior art methods and apparatus for measuring flatness of substrates are known in the art as follows: U.S. Pat. No. 6,323,952, issued Nov. 27, 2001 to Yomoto et al., describes a flatness measurement apparatus including a TV camera coupled to a Fizeau interferometer. The apparatus operates using the method of tracking fringes and a fringe contrast judging criteria is utilized that requires a high degree of visibility of the fringes. There is also the problem of assessing height steps in the substrate. Also, this method is limited to measuring a single surface at a time.

U.S. Pat. No. 6,321,594 B1 issued Nov. 27, 2001 to Brown et al., describes a laser triangulation method for assessing bulging or bowing of thin films. This approach is also limited to measuring a single surface at a time.

U.S. Pat. No. 5,402,234 issued Mar. 28, 1995 to Deck, describes a coherence scanning interferometry-based microscope including a CCD camera and a constant velocity z-axis stage coupled to the sample for scanning the depth of the sample. The sample is in one leg of the interferometer and the relative intensity of the interference peak is analyzed as a function of height of the transport stage using an interference discriminator. Only one surface at a time can be analyzed by this method.

Methods for simultaneously measuring the thickness and group index of refraction of films using low coherence light interferometry in an autocorrelation configuration are also known in the prior art. For the purposes of this discussion, an interferometer operating in an autocorrelation configuration is defined to be an interferometer having a variable differential time delay. One embodiment of an optical autocorrelator is described, for example, in chapter 5 of Statistical Optics, by Joseph W. Goodman (John Wiley & Sons, 1985, pp. 157–170). Those skilled in the art are aware of the principles of operation of an optical autocorrelator, but certain principles will be clarified here because of their relevance to the present invention. In an interferometer operating in an autocorrelator configuration wherein light is split into two different paths and then recombined and directed to a photodiode, the detected light intensity is measured as a function of a parameter. This parameter can be the differential optical path length $\Delta L$ of the interferometer or it can be the differential time delay $\Delta t$ of the interferometer. These parameters are related by $\Delta L = nc\Delta t$, where c is the speed of light in vacuum and n is the group index of refraction of the medium (usually air) of the differential optical path. The detected light intensity expressed as a function of the differential time delay is called the coherence function of the input light. Hence, a receiver which determines the time delay between light reflected from different surfaces of a film performs the same function as a receiver which determines the path delay between light reflected from different surfaces of a film. Determining the spacing between peaks in the coherence function of the reflected light is yet another way to describe the same function. For the purposes of the present discussion, the term differential time delay shall include differential path delay.

A Michelson interferometer is an example of such an interferometer operating in an autocorrelation configuration. An example of an apparatus for measuring film thickness utilizing a Michelson interferometer is taught in U.S. Pat. No. 3,319,515 issued May 16, 1967 to Flournoy. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input.

U.S. Pat. No. 5,633,712 issued May 27, 1997 to Venkatesh et al., discloses a method and apparatus for simultaneously determining the thickness and group index of refraction of a film using low-coherence reflectometry in an autocorrelation configuration. The apparatus includes a low coherence light source that generates a probe light signal. The film is positioned between first and second reference reflectors, the first reference reflector being partially reflecting. The probe light signal is applied to the film after passing through the first reference reflector. The portion of the probe light signal leaving the film is reflected back toward the first reference reflector by the second reference reflector. The light exiting through the first reference reflector is collected to form the input to a receiver that determines the time delay between light reflected from the top and bottom surfaces of the film as well as the change in optical path length between said first and second reflectors resulting from the introduction of said film between said first and second reflectors.

Prior art methods for measuring the surface profile of a sample include the use of contact profilometry, which employs a probe to physically contact the surface of the sample and generate a surface profile. Non-contact methods for surface profile measurement include optical phase shifting interferometers as described in U.S. Pat. No. 4,955,719 issued Sep. 11, 1990 to Hayes, and vertical scanning interference microscopy as described in U.S. Pat. No. 5,446,547 issued Aug. 29, 1995 to Guenther et al. These traditional non-contact methods require turning the sample over and engaging in edge and corner alignment in an attempt to measure the top and bottom surface profiles of corresponding locations.

There is a need therefore to provide an improved apparatus and method to measure surface profiles and orientation of surfaces, such as the surfaces of a digital imager in its package, the effects of wafer processing conditions, bonding and packaging on the resultant flatness of an image sensor light receiving surface.

SUMMARY OF THE INVENTION

The need is met according to the present invention by providing apparatus for measuring the surface profile of a sample that includes a fixture for locating a surface of a transparent optical flat relative to a surface of a sample; a low-coherence light interferometer having an optical probe coupled to an XY scanning frame for scanning the surface of the sample through the transparent optical flat to produce interferometric data signals representing the distances between the optical flat surface and the surface of the sample; and a computer system responsive to the interferometric data signals for generating a surface profile of the sample using a best fit to a plane.

ADVANTAGES

The measurement apparatus and method of the present invention has the advantage that it can be used during imager curing for assessing the cure cycle of adhesives used to bond digital imagers to packages and to observe wafer bow arising from manufacturing process steps and also to evaluate package flatness. Measurements of a 2" by 2" surface can be made in minutes.

DETAILED DESCRIPTION OF THE INVENTION

We have developed an apparatus and method to map the flatness of the entire surface of a digital imager and also includes surface maps of the imager cover glass thickness, cover glass bow and imager gap. The apparatus includes an XY movable transport stage for positioning an optical probe over the imager surface to be measured. An optical flat is placed above the imager to provide a flat reference plane to measure against. The imager may be mounted into a socket in such a way that the optical flat is mounted approximately parallel to the imager surface. Surface profiles are performed utilizing low-coherence light interferometry. The low-coherence interferometer measures distances between optical interfaces in the path of the beam including the bottom surface of the optical flat, the top surface of the imager cover glass, the bottom surface of the imager cover glass and the light receiving imager surface. The surface profiles are then calculated, leveled and imager bow and deviation from flatness are then calculated.

This measurement method and apparatus can also be adapted to measure the changes in flatness of the imager chip throughout the various steps of the imager assembly process. The flatness of the imager package can be assessed before bonding of the imager chip, the imager chip flatness can be assessed, and the imager chip flatness glued into the package both before and after curing can be assessed. The effects on imager flatness of imager adhesive and adhesive curing time and temperature can be assessed utilizing this measurement approach. The effects of varying the cure cycle of adhesives and how the imager is placed in the package can also be studied to improve the flatness of the bonded imager surface in the package. Similar apparatus and methods have been developed to measure wafer flatness and digital imager package flatness. The apparatus can also be used on an in-line production facility, which performs wafer processing to measure the flatness of imagers on the wafer. The change in flatness after dicing the wafers into the individual imagers can then also be assessed.

Figure 1:
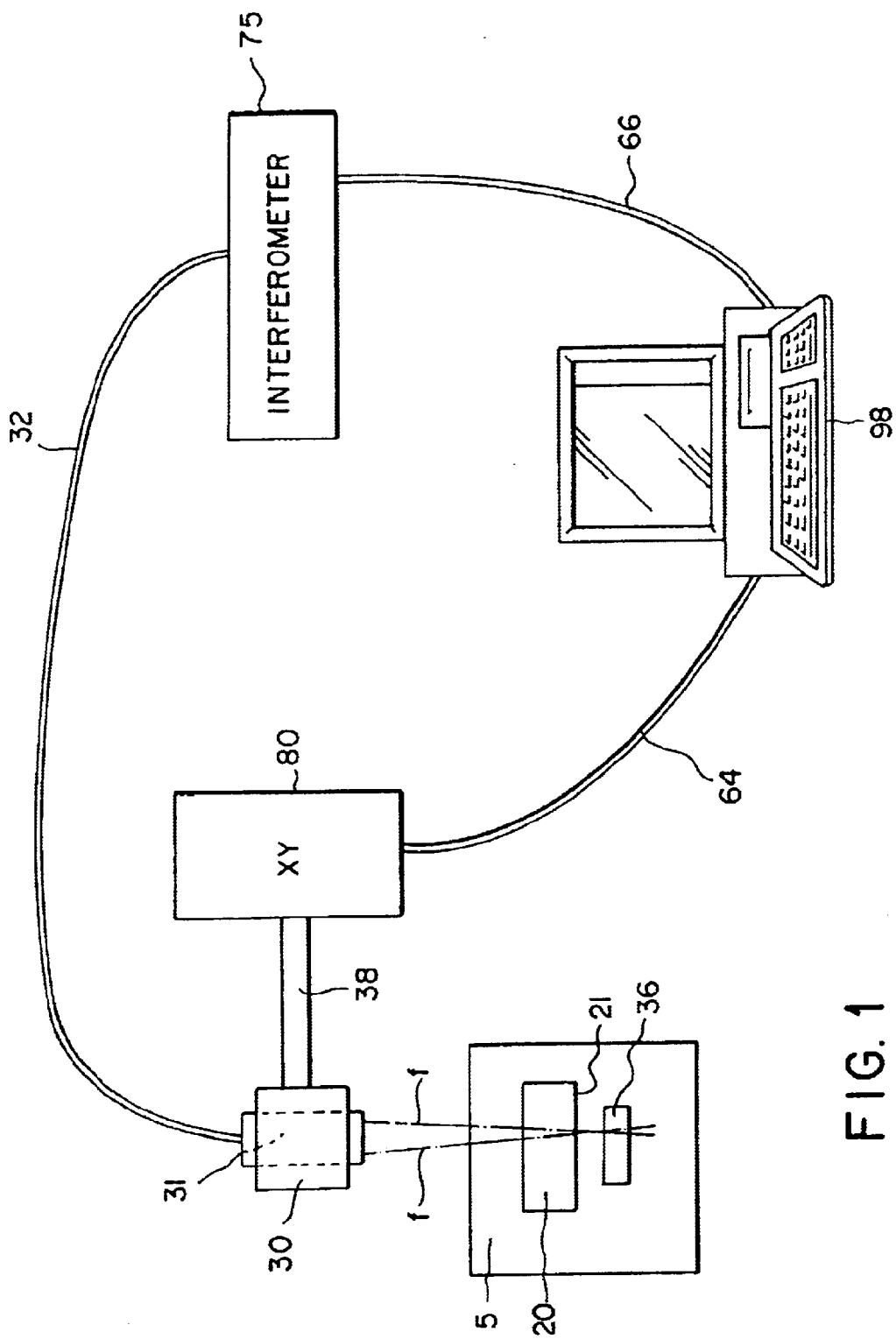
FIG. 1 is a schematic diagram of a measurement system according to the present invention.

FIG. 1 shows a schematic diagram of the measurement system used to practice this invention. The measurement system includes an interferometer 75 which is set up to measure distances between an optical flat 20 and the surfaces of a sample under test 36 mounted approximately parallel to each other in a measurement fixture 5. An optical probe 30 containing a focusing lens 31 is coupled to the interferometer 75 via probe optical fiber 32. Low coherence light coming from the interferometer 75 is focused by lens 31 as shown by dashed lines f, so that the surface of the optical flat 21 adjacent to the sample and the surfaces of interest in the sample, are located within the focal depth of the optical probe. The optical probe 30 is mounted to the movable part of an XY scanning frame 80 by probe mount 38. Computer 98 is used to control the movement of the X and Y stages comprising XY scanning frame 80 via XY stage control cable 64, to control the interferometer measurement amplitude and measurement rate, and to store and process the interferometric data signals representing the distances between the optical flat surface and the surface of the sample obtained via interferometer data acquisition and control cable 66 during the interferometer measurement period.

Figure 2:
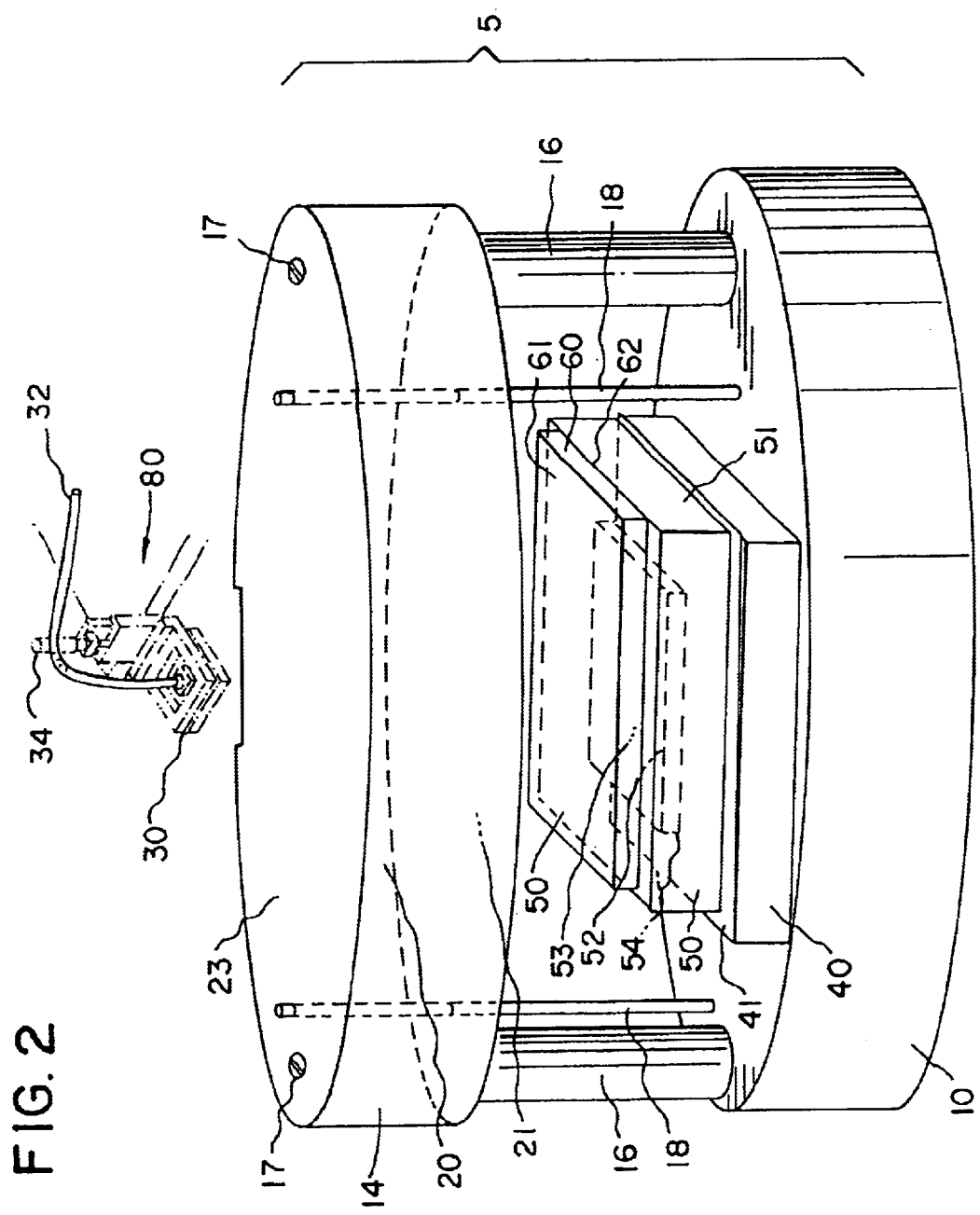
FIG. 2 is a schematic diagram of a measurement fixture for holding an imager.
Figure 3:
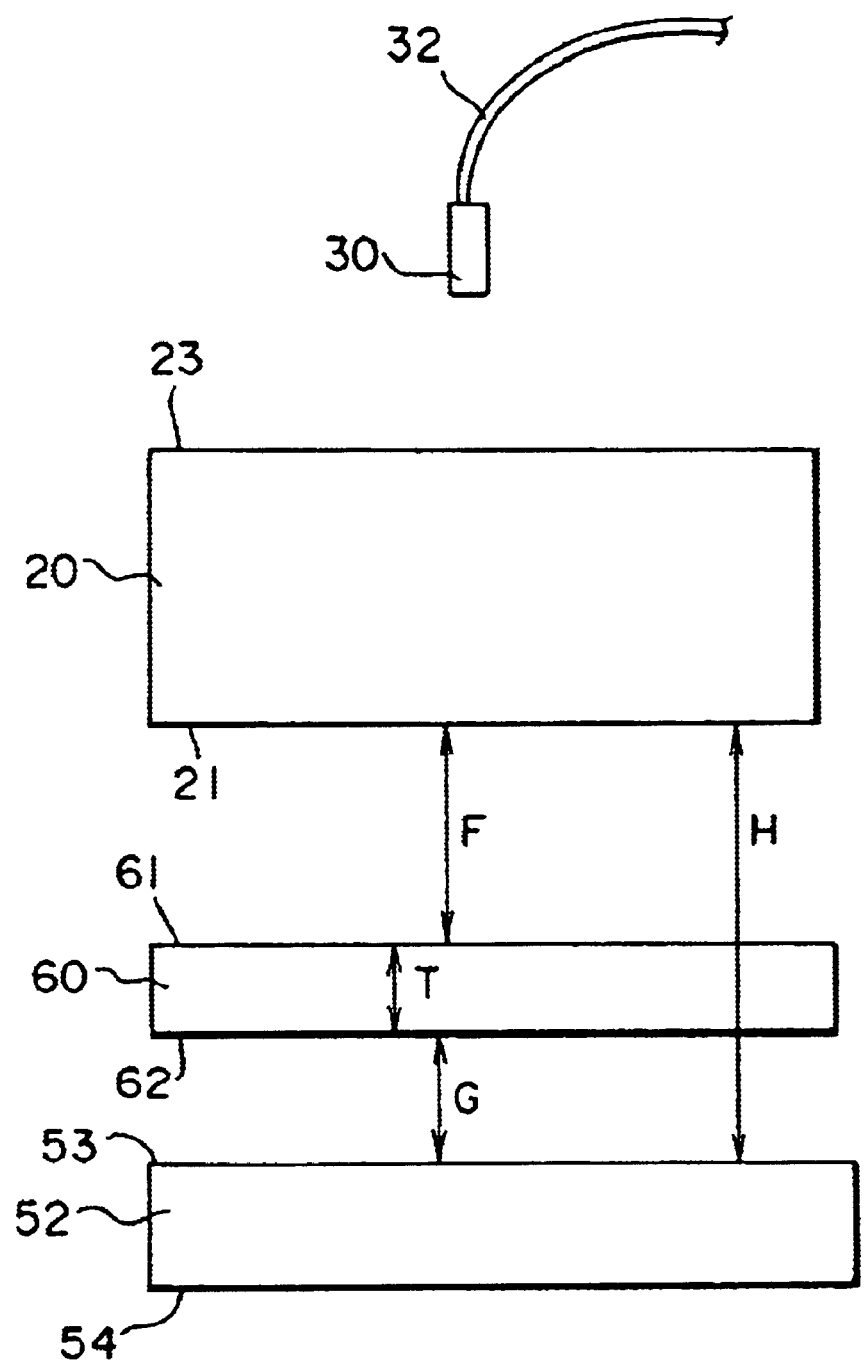
FIG. 3 is schematic diagram of the measurement geometry for imager mapping.
Figure 4:
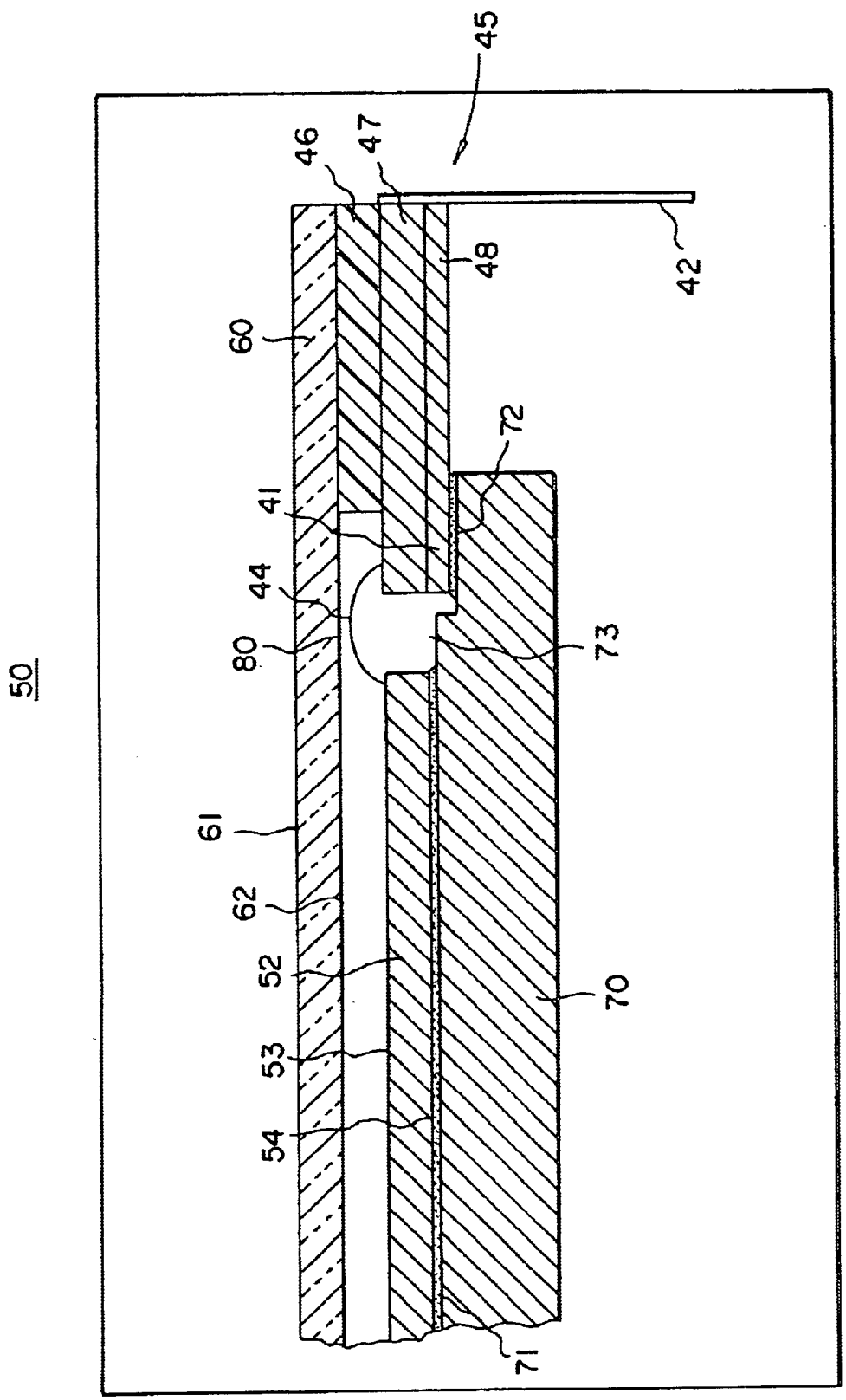
FIG. 4 shows a partial sectional view of an imager.

FIGS. 2–4 show the imager mapping measurement fixture, the imager mapping measurement geometry and a partial view of a packaged imager respectively. When mapping the surfaces of packaged digital imager 50 which include an imager package 51, an imager chip 52, and an imager cover glass 60 installed at some spacing above the imager light receiving surface 53 we have found that we cannot assume that the cover glass 60 is flat. Therefore, we have developed a method and apparatus to map the entire surface of an imager including maps of the cover glass thickness T and flatness, imager gap G and imager surface profile. The procedure is as follows:

The imager 50 is mounted into the imager mapping measurement fixture S as shown in FIG. 2. An expanded cross-sectional view of a typical digital imager 50 is shown in FIG. 4. The imager 50 includes a package substrate 70 with a top surface 73 which functions as the image sensor mounting surface, a leadframe 45 attached to the substrate by a bonding layer 72, and imager chip 52 with an light receiving surface 53 and a bottom surface 54 attached to the substrate by bonding layer 71. The leadframe 45 includes imager lead prongs 42, a leadframe bottom layer 48, a lead frame conductive layer 47 for electrically connecting the signals from the imager chip 52 to the lead prongs 42 via the wirebond 44 and a lead frame top pad 46 which includes a shelf for holding imager cover glass 60 with a top surface 61 and a bottom surface 62. The bottom surface 62 of imager cover glass 60 is usually bonded to the lead frame top pad 46.

Figure 5:
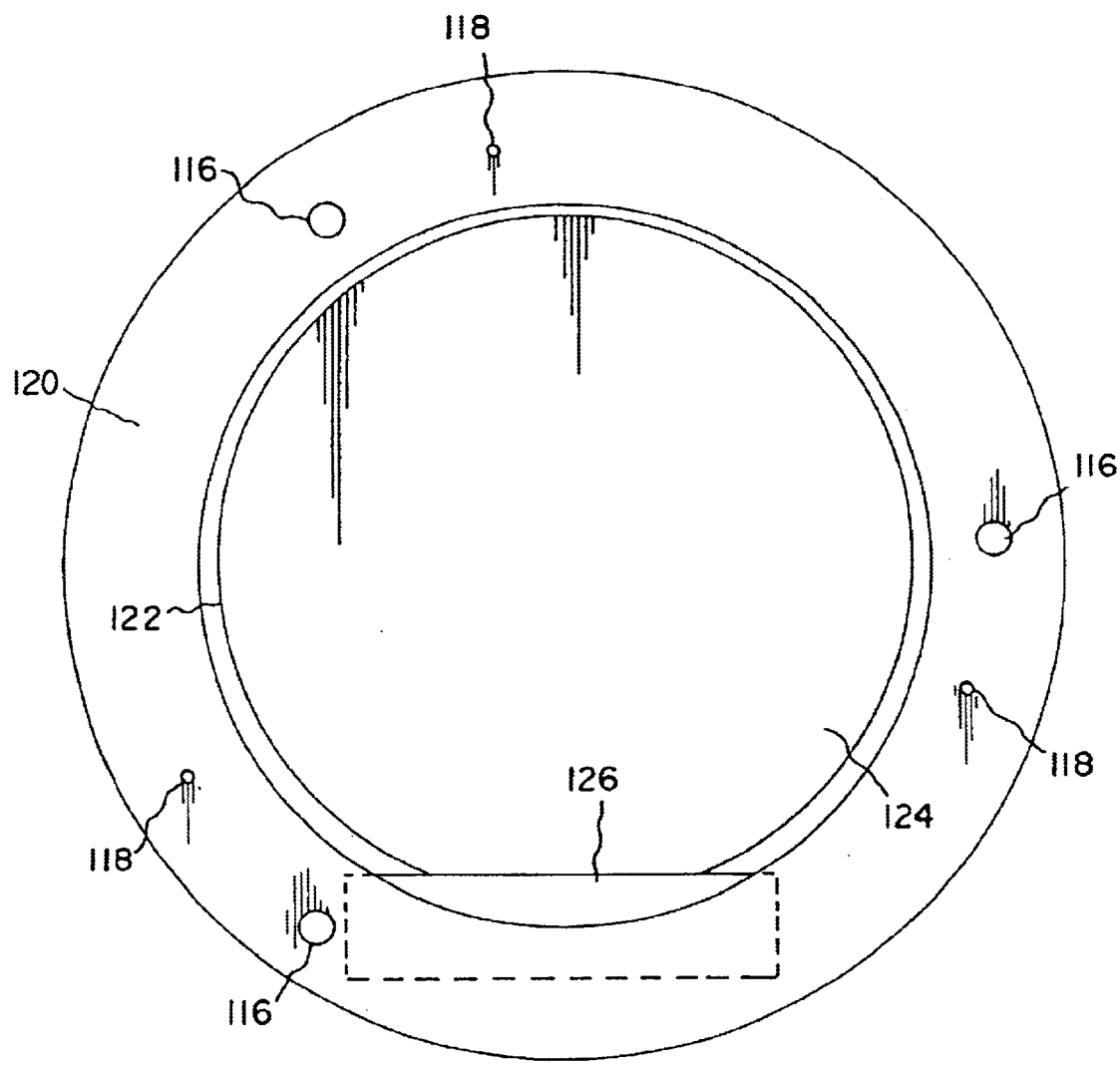
FIG. 5 shows a top view of an alternative base plate used in the measurement fixture shown in FIG. 2.

Measurement fixture 5 of the imager mapping set up shown in FIG. 2 includes a base plate 10 that supports an optional imager-mounting receptacle 40 containing an imager-mounting socket 41 at its top. Alternate base plate designs can be utilized to support different types of samples such as that described to measure wafers as shown in FIG. 5. The imager-mounting receptacle is designed to fit a variety of imager package sizes and styles and imager lead prong geometries. Before starting a measurement sequence, imager lead prongs 42 of imager 50 are inserted into the imager-mounting socket 41. The apparatus also includes a top plate 14 which holds an optical flat 20 in place. Optical flat 20 includes a top surface 23 and a bottom surface 21 that is aligned to be nearly parallel to the imager light-receiving surface 53 of imager 50. Adjustable height spacers 16 are used to control the distance between the bottom surface of the optical flat 21 and the imager light-receiving surface 53 with adjustment screws 17. Optional alignment pins 18 are used to aid in alignment of the apparatus top plate 14 so that it is made nearly parallel to the imager light receiving surface 53. An optical fiber cable 32 coming from the interferometer (not shown) is used to couple light to and from the sample through the optical probe 30. A z height micrometer 34 is used to adjust the height of the probe to optimize the signal reflected back from the imager 50. The optical probe 30 includes an optional gimbal mount for optimizing the light signal that is reflected back from the imager and into the interferometer. The optical probe 30 is also attached to an XY scanning frame 80 which is under computer control and includes X and Y axis translation stages utilized for scanning the optical probe 30 over the surface of the imager during a measurement.

Optical probe 30 includes a lens 31, which focuses light on to the imager 50. This light passes through and is reflected off of the optical flat 20 having a top surface 23 and a bottom surface 21, the imager cover glass 60 having a top surface 61 and a bottom surface 62, and the imager light-receiving surface 53. The optical flat 20 is thick enough so that the top surface 23 is not located within focal depth of the optical probe lens. FIG. 3 shows the measurement parameters of interest including the distance between the bottom surface of the optical flat 21 and the top surface of the imager cover glass 61 labeled F, the thickness of the imager cover glass 60 labeled T, and the imager gap G defined as the distance between the bottom surface of the imager cover glass 62 and the imager light receiving surface 53.

The surface topography of the light receiving imager surface 53 is determined by mapping the distance between the bottom surface of the optical flat 21 and the imager light receiving surface 53 labeled H as a function of x and y position over the surface of the imager. The distance H is given by:

$$H(x,y) = F(x,y) + T(x,y) + G(x,y) \tag{1}$$

where F(x,y) is the distance between the optical flat reference surface and the cover glass profile, T(x,y) is the cover glass thickness profile, G(x,y) is the imager gap profile, x and y are the x and y coordinates respectively. The imager bow is calculated from the surface map H(x,y) by subtracting out the best planar surface fit.

FIG. 5 shows a top view of an alternate base plate 120 of measurement fixture 5 useful in mapping processed and unprocessed wafers used in the manufacturing of digital imagers. The base plate includes adjustable height spacer receivers 116 and alignment pin receivers 118 for mating to the adjustable height spacers 16 and alignment pins 18 respectively of measurement fixture 5. There is also a shelf recess 122 with an alignment keyway 126 for holding a silicon wafer in a known orientation. There is also an optional flat surface 124 that can be placed in the center of the recess for holding other types of samples and could also include means for holding imager-mounting receptacles 40 as shown in FIG. 2.

Figure 6:
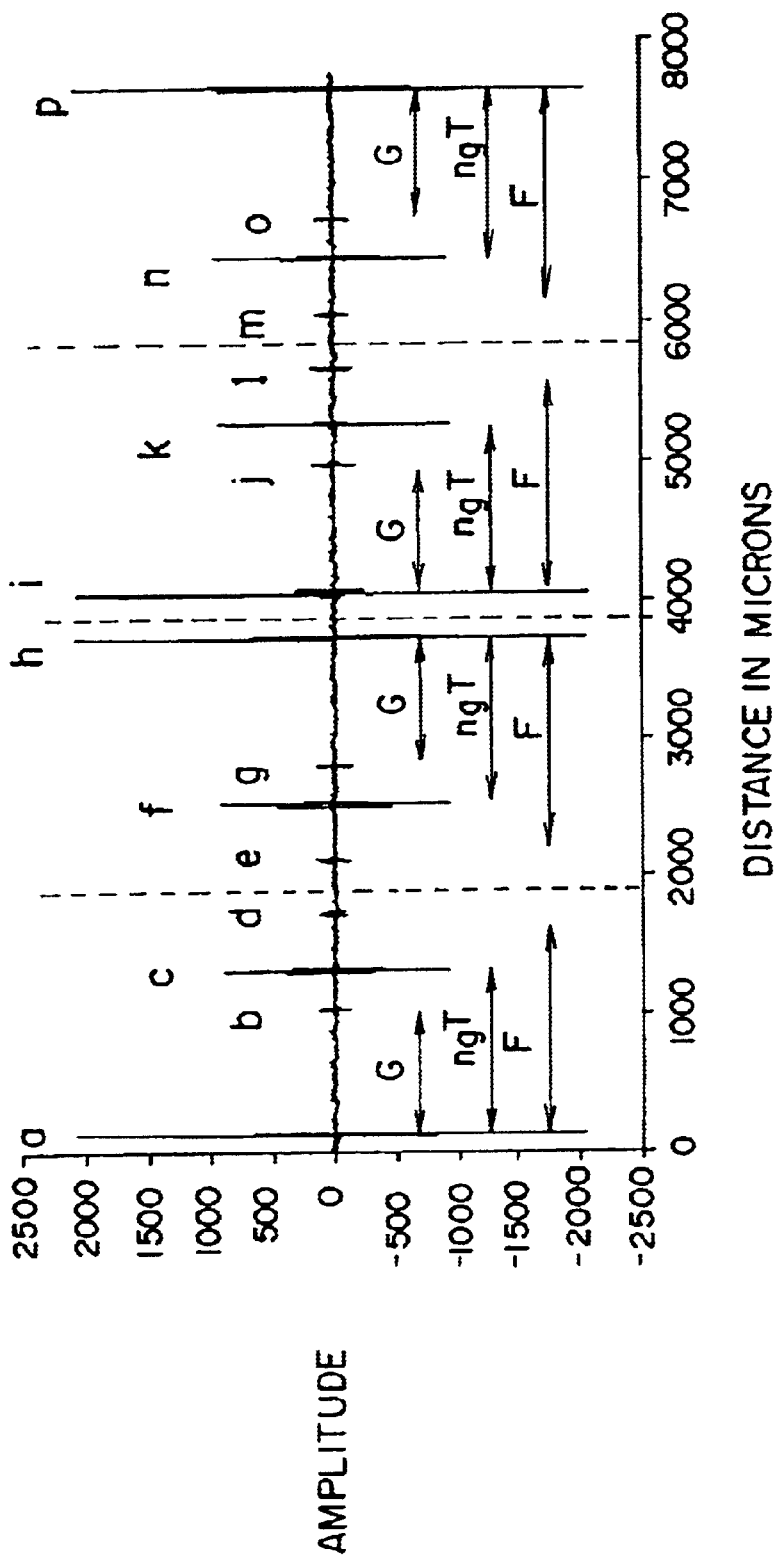
FIG. 6 is a graph of a portion of an interferometer raw data signal file obtained with the interferometer operating at two measurements per motor scan cycle.

FIG. 6 shows part of an interferometer raw data file obtained in the imager mapping apparatus showing peaks a–p and indicating measured parameters with arrows. The data shown in FIG. 6 was obtained during measurement of an imager with a low reflection cover glass when the interferometer optical path variation was set up for 2 measurements per scan cycle of the interferometer. The largest peaks labeled a, h, i and p are called zero-crossing peaks. These zero-crossing peaks occur when the two path lengths in the interferometer arms are equal.

For the interferometer data shown in FIG. 6, the interferometer motor scan direction changes between zero-crossing peaks h and i, and the location of the interferometer motor scan direction change is indicated by the dashed vertical line shown in FIG. 6. The optical path difference in the interferometer is a maximum between peaks d and e and peaks l and m. The interferometer scan direction also changes midway between peaks d and e and peaks l and m as indicated by the dotted vertical lines shown in FIG. 6. The interferometer provides nonzero interference signals at optical distances corresponding to the relative path length differences between the zero crossings and the optical interfaces occurring in the sample under test. The optical distance measured for the imager cover glass 60 is $n_g T$ where $n_g$ is the group index of refraction of the imager cover glass 60 at the wavelength $\lambda_{lc}$ of the low-coherence light source in the interferometer. The distances $n_g T$ are given by distances ac, fh, ik and np. The thickness T of the imager cover glass 60 can be found by dividing $n_g T$ by the known group index of refraction $n_g$ of the imager cover glass 60.

A typical cover glass 60 has been found to have a group index of refraction $n_g$=1.53355 at $\lambda_{lc}$=1300 nm. The distance F is the physical distance between the bottom surface of the optical flat 21 and the top surface of the imager cover glass 61 and is indicated by distances ad, eh, il and mp in FIG. 6. The distance G is also the physical distance between the bottom surface of the imager cover glass 62 and the imager light receiving surface 53 which are given by the distances ab, gh, ij and op in FIG. 6. Since the optical flat 20 is physically very flat the surface profile F(x,y) provides a measurement of the bow of the top surface of the imager cover glass 61. The profile T(x,y) is a measure of the flatness of the imager cover glass 60, and the profile G(x,y) indicates the variation in the imager gap.

Figure 7:
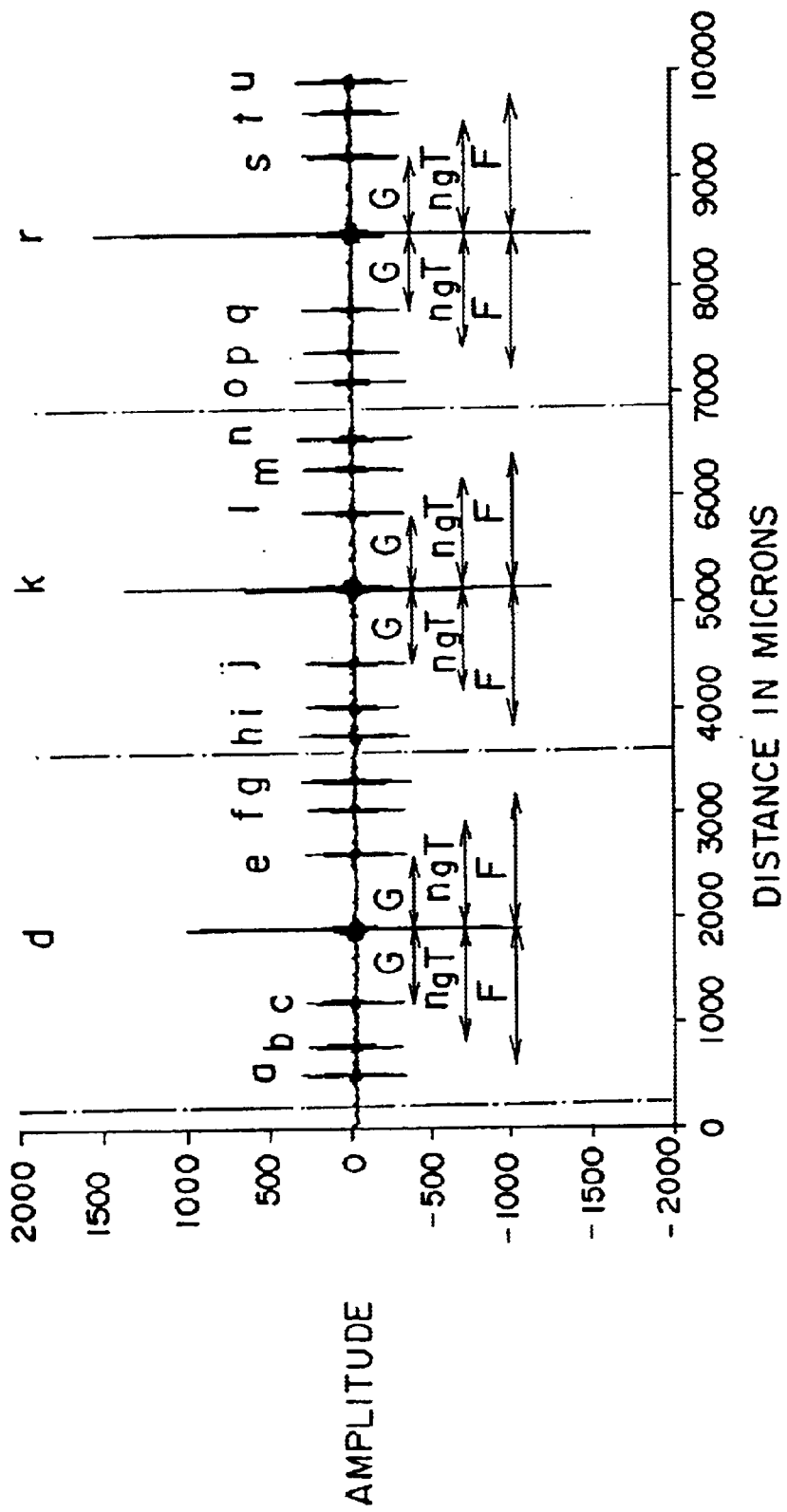
FIG. 7 is a graph of a portion of an interferometer raw data signal file obtained with the interferometer operating at four measurements per motor scan cycle.

FIG. 7 shows part of an interferometer raw data file obtained in the imager mapping apparatus showing peaks a–u and indicating measured parameters with arrows. The data shown in FIG. 7 was obtained with the interferometer set up to measure at 4 times the scanning rate of the interferometer. Peaks d, k and r are zero-crossings and the vertical dashed lines indicate locations at which the interferometer motor scan reverses direction. Distances cd, de, jk, kl, qr and rs are measurements of the imager gap G, distances bd, df, ik, km, pr and rt are measurements of $n_g T$ and distances ad, dg, hk, kn, or and ru are measurements of distance F.

Figure 8:
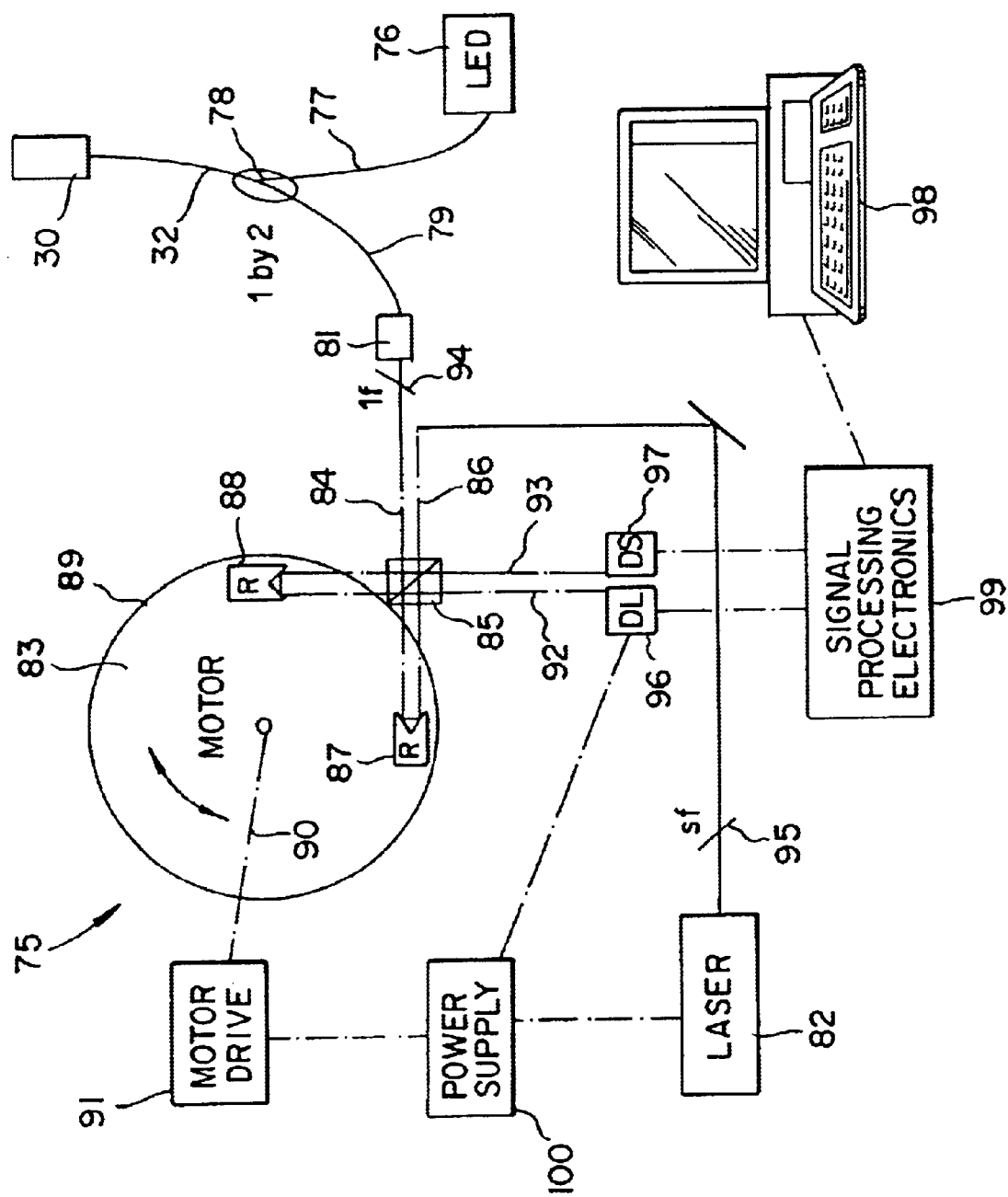
FIG. 8 is a schematic diagram of a dual Michelson interferometer useful in the practice of this invention.

Referring now to FIG. 8, a schematic diagram of an apparatus referred to as a dual Michelson interferometer including a first low-coherence light interferometer and a second coherent light interferometer employed in the practice of the present invention is shown. The interferometer, generally designated 75 includes a first rotating head Michelson interferometer (or other optical autocorrelator or interferometer having a variable differential time delay) set up in an optical autocorrelation configuration mode. Low coherence light from a 1300 nm broadband light emitting diode (LED) 76 is directed to the measurement fixture 5 by a single mode fiber 77 through a 1 by 2 coupler 78 into probe optical fiber 32. Light reflected from the sample mounted in the measurement fixture 5 is introduced into both arms of the interferometer 75 by single mode fiber 79 after being collimated by collimator 81.

Coherent light generated by a laser 82 shares some of the same elements as the first interferometer and is utilized to track the distance that the optical path of the first interferometer changes as the optical head 83 rotates to change the lengths of the arms of the interferometer.

Light from the light emitting diode 76 is focused into the measurement fixture 5 through an optical focusing probe 30. Some light is reflected off each optical surface in the measurement fixture 5 and is returned to the interferometer 75. All of these reflected light signals pass back through the optical probe 30, are sent back down the same probe optical fiber 32 and pass through the 1 by 2 optical coupler 78 and into single mode fiber 79 and are then collimated by collimator 81. These signals are introduced into the rotating optical head 83 of the interferometer as the top beam 84 on the right side of a beam splitter cube 85. The interferometer is set up in a bulk Michelson configuration. Solid lines in FIG. 8 indicate the light paths. There is also a second light path for a reference beam (bottom beam) 86 (preferably generated by a helium neon laser 82, having a wavelength $\lambda$=632.991±0.0005 nm), which arrives at the beam splitter cube 85 as the bottom beam 86 on the right side.

A pair of hollow-cube retroreflectors 87 and 88 are mounted 90° apart on a rotatable platform 89, preferably having a diameter of about 87 mm. The beam splitter cube 85 divides the laser and LED beams into pairs of light beams directed toward the hollow retroreflectors 87 and 88. The hollow retroreflectors 87 and 88 are pre-aligned to form the two reflective arms of the Michelson interferometer with respect to the beam splitter cube 85. Rotating a shaft 90 connected to the platform 89 causes the path length of one arm to increase while the path length of the other arm decreases by the same amount. A brushless DC motor drive 91 attached to the shaft 90 of the platform produces the rotation. Power supply 100 provides power to the motor drive 91, the laser 82, the LED 76 and the other elements of the apparatus. The interfering output beams 92 and 93 of the interferometer 75 are applied to a pair of detectors 96 and 97, for the laser light and for the low-coherence light beam respectively. A laser notch filter 94 is used to block the light from the laser 82 from being incident on the measurement fixture 5. A bandpass filter 95 is used to prevent light from LED 76, reflected from the measurement fixture 5, from entering the laser cavity of laser 82.

During operation, the rotating head motor drive 91 is cycled to alternately increase and decrease the optical path difference in the interferometer. Light signals from both the laser 82 and the low coherence LED light source 76 traverse the same optical path length in the interferometer arms, but in reverse order as they travel to and from the pair of retroreflectors 87 and 88. The beam from the HeNe laser 82 enters the beam splitter 85 from the lower right side and is split into two beams at the lower right intersection point, which travel to the left and up respectively as shown in FIG. 8. The laser beam traveling to the left from the beam splitter goes to the horizontal retroreflector 87, entering from the bottom right and arriving back at the beam splitter 85 on the top left. The laser beam traveling to the top retroreflector 88 arrives on the bottom right side and returns to the beam splitter 85 on the top left side where the two laser beams are recombined. The recombined laser beams interfere with each other, and are split into two beams at the beam splitter 85. One beam goes to the laser detector 96 and the other one travels to the right. The recombined laser beam traveling to the right from the top left intersection point is blocked by the laser notch filter 94 thereby preventing laser light from illuminating the measurement fixture 5.

As the motor shaft 90 rotates, the optical path lengths of the two arms of the interferometer change simultaneously, and interference fringes occur every half wavelength of optical path difference in the laser detector 96. A similar analysis for the light coming from the sample shows that it follows the same optical path, but in reverse order.

The stabilized HeNe laser interferometer is utilized to track the distance the optical path has changed during rotation of the optical head 83. A threshold value on the laser signal is utilized to provide a sequence of data acquisition trigger signals at constant distance intervals for collecting interferometric data from the low-coherence light interferometer. Thus, the purpose of the laser interferometer is to track the distance the rotating optical head moves while the low-coherent light interferometer is collecting data from the sample.

For the low-coherence light source 76, constructive interference occurs when the path lengths of the two arms in the interferometer are equal within a few coherence lengths. In order for constructive interference to occur, light must be reflected back into the interferometer from the measurement fixture 5. This will occur at each optical interface in the measurement fixture 5. The distance between adjacent interference peaks represents the optical thickness (group index of refraction (n) times the physical thickness) of materials, including air, in the measurement fixture 5.

Since the instrument uses a stabilized laser light source for providing constant distance interval measurements, the instrument measures absolute optical path distance defined as (n) times thickness. The measurement configuration of the interferometer is the optical autocorrelation mode, in which light reflecting from the measurement fixture 5 is input to both arms of the Michelson interferometer. In the autocorrelation mode, light reflecting from the measurement fixture 5 is made to interfere with itself, and both arms of the interferometer see reflections from all of the optical interfaces in the measurement fixture 5. As the path lengths of the two arms of the interferometer are changed, a series of interference peaks are observed, indicating the optical path differences between adjacent optical interfaces. The self-correlation condition occurs when the two path lengths of the Michelson interferometer are equal, in which case, all optical interfaces in the sample interfere constructively. The measured distance between the largest peak, at zero path length difference, and the first set of adjacent peaks is the shortest optical path difference in the measurement fixture.

Data acquisition and analysis is performed utilizing a computer 98, such as a Pentium computer containing National Instrument data acquisition cards. The periodicity of the laser light is utilized to track distance that the low-coherent light interferometer moves. Signal Processing electronics 99 and data analysis routines running under Lab Windows CVI or a Labview program development environment (available from National Instruments) running on computer 98 are utilized to analyze low-coherent light interferograms resulting from reflections at optical interfaces in the measurement fixture 5.

Figure 9:
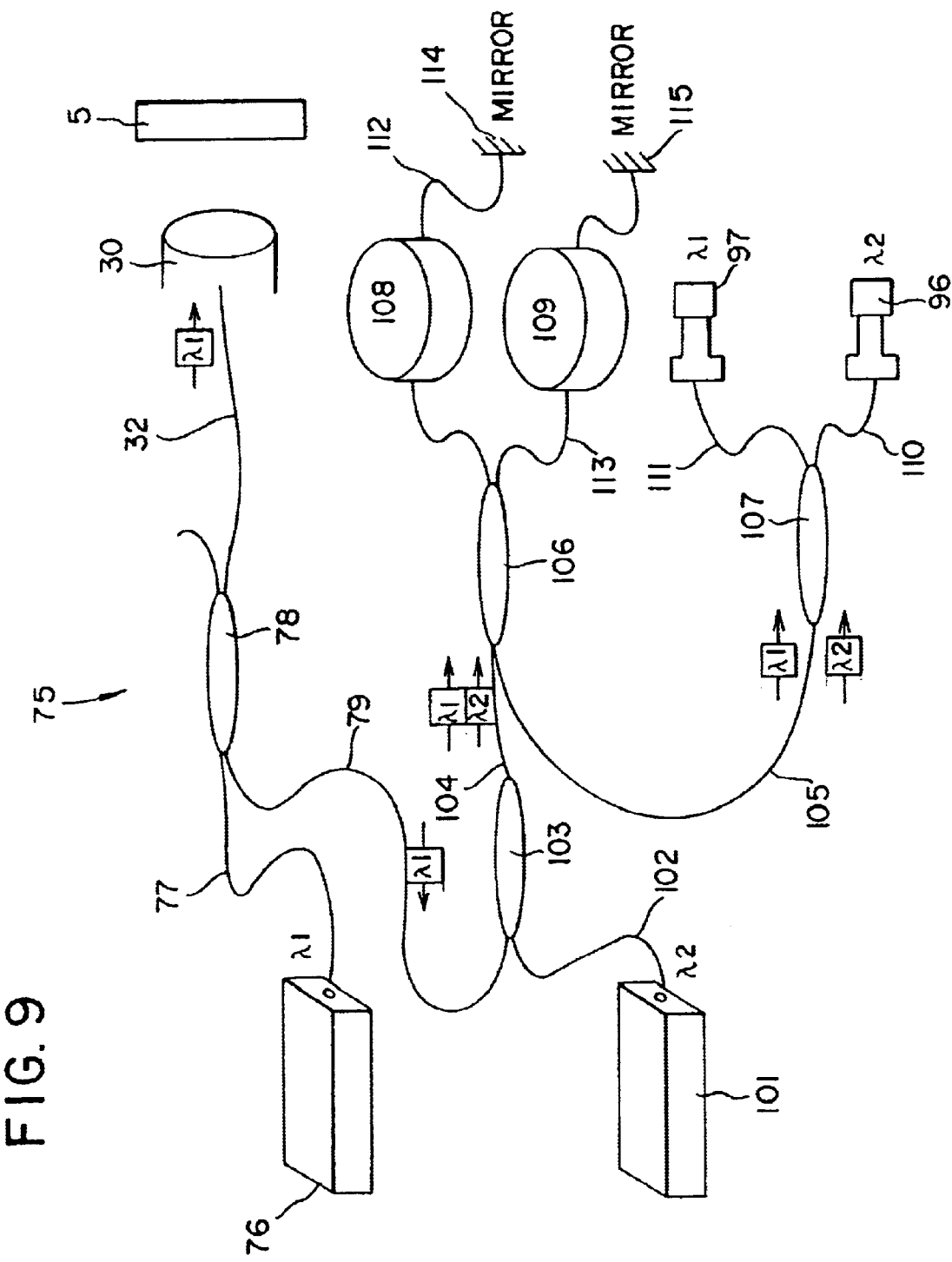
FIG. 9 is a schematic of an alternative configuration of a fiber optic Michelson interferometer useful in the practice of this invention.

FIG. 9 shows an alternate embodiment of the interferometer 75 used in the practice of this invention. Components common to both this design and that shown in FIG. 8 have the same number designation. This is an all fiber interferometer and the laser 101 is preferably a temperature stabilized single mode laser diode operating at about 1550 nm. The laser diode is coupled to single mode fiber 102. Wavelength Division Multiplexer (WDM) 103 combines the low coherence light traveling down single mode fiber 79, returning from measurement fixture 5, with the laser light traveling along single mode fiber 102. The combined light travels down single mode fiber 104 and is input into a 50/50 fiber coupler 106. The output of coupler 106 is split into a pair of single mode fibers 112 and 113, which make up the two arms of the Michelson interferometer. Fibers 112 and 113 are coiled around a pair of piezoelectric modulators 108 and 109 respectively, which are operated in a push-pull fashion to alternately change the effective optical path length along the optical fibers 112 and 113. The data shown in FIG. 7 was obtained with this interferometer scanning at a motor frequency of 100 Hz for a 400 Hz measurement rate. The piezoelectric modulators are driven with sine or triangle waveforms at frequencies in the range of 10 Hz to 1 kHz and path length differences of up to 10 mm have been achieved in practice. Mirrors 114 and 115 are coupled to the distal ends of optical fibers 112 and 113 to reflect light back into the 50/50 coupler 106. The returning light from fibers 112 and 113 interferes and the coupler 106, modulators 108 and 109, fibers 112 and 113 and mirrors 114 and 115 form an all fiber Michelson interferometer. The interfering light returning from the 50/50 coupler travels along single mode optical fiber 105 and is split into two wavelength components by wavelength division multiplexer 107. The laser light coming out of WDM 107 travels down fiber 110 into laser interference detector 96 and the low coherence light coming out of WDM 107 travels down fiber 111 into low-coherence light interference detector 97.

The measurement application for measuring 2-dimensional (2D) imager planarity integrates data acquisition with the control of an XY scanning stage used to move the interferometer probe over the region-of-interest in the imager. The imager area is scanned in a raster-like fashion from a known starting point and in the direction specified by the user. Interferometer data is continuously collected while the stage traverses in one direction, the 'scan direction' (in the X axis for example). At the end of the scan, the stage is reversed and returned to the starting point in the scan direction. At the same time the stage is indexed in the other direction, the 'index direction' (the Y axis for example), in preparation for the next scan. Also during this time, the data collected from the X-axis scan is analyzed producing a sequence of measurements equally spaced throughout the scan distance. This data is stored into a sequential data file as shown in Table I below. The process is repeated until the entire region of interest in the sample is scanned.

To achieve a uniform distance between measurement points, data is collected and analyzed only while the stage is moving at constant velocity. To accomplish this, the drive is programmed to output a pulse that is active only when the stage is moving at constant velocity. This pulse signal is brought in as a gate signal to the data acquisition (DAQ) card in the PC to control the period over which data is collected. At the beginning of each scan the DAQ card is armed awaiting the gate signal. When the gate signal becomes active, data acquisition begins and continues until the gate signal returns to the inactive state. To compensate for acceleration and deceleration, the software automatically adjusts the starting point and overall travel distance in the scan direction based on the velocity and acceleration of the drive in the scan direction. This insures that the drive is at constant velocity over the region-of-interest of the sample and starts acquisition at the same position along the scanning axis for each given scan line.

Figure 10:
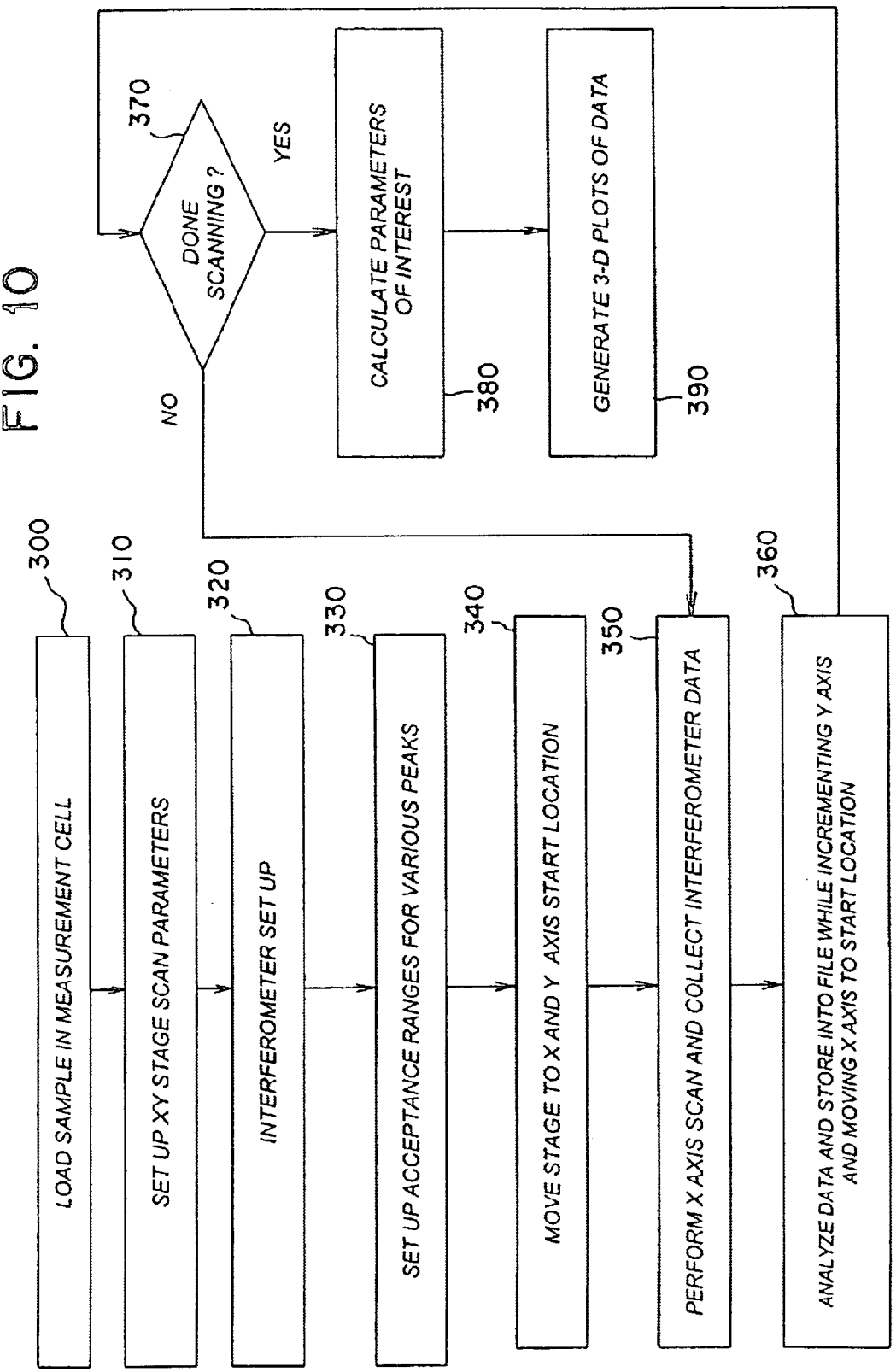
FIG. 10 is a flowchart of the measurement procedure of the present invention.

FIG. 10 shows a flowchart detailing the steps performed during the measurement procedure. The sample is loaded into the measurement fixture (step 300). The X and Y transport stage scan parameters of the XY scanning frame are then set up (step 310). In general the starting location of the region of interest is chosen along with the scan direction (X-axis for example), and the index direction (Y-axis for example). For the data shown in FIGS. 15–18 the surface was scanned over an X scan distance of 35 mm with a constant velocity of 70 mm/sec using an initial acceleration of 200 mm/sec and a similar deceleration rate. The Y-axis was incremented in 0.175 mm steps with a total scan distance of 35 mm so that there would be 201 scan lines of data. The interferometer is then set up (step 320) with an appropriate scan frequency, amplitude and motor offset position sufficient to observe all of the optical interfaces of interest, and so that the distances between adjacent zero crossings between individual scans are symmetric. The interferometer motor frequency for the data shown in FIG. 7 and FIGS. 15–18 was 100 Hz resulting in a measurement rate of 400 Hz. Thus each X-axis scan in FIGS. 15–18 would have approximately 200 equally spaced measurements across the scan. The acceptance ranges for the various peak distances (step 330) are then set up. Further detail on the use of acceptance ranges can be found in copending U.S. patent application Ser. No. 09/521,089, which is incorporated herein by reference. For the data shown in FIGS. 15–18 and Table I the acceptance ranges were 900 $\mu$m<G<1050 $\mu$m, 1060 $\mu$m<$n_g$T<1300 $\mu$m, and 1350 $\mu$m<F<1700 $\mu$m.

The transport stage is then moved to the X and Y-axis start locations (step 340) taking into account the desired starting measurement location of the sample and the velocity and acceleration of the stage in the scan direction. From that point, an X-axis scan (step 350) is initiated, and interferometric data is collected only over that portion of the scan interval where the transport stage is moving at constant velocity. Before the first scan is performed, a data file is created and the instrument set up parameters are written into the header file of the data file, an example of which is shown in Table I. After the scan is performed, the interferometric data is analyzed, sorted based on the acceptance ranges, and then added to the file. At the same time, the stage is incremented in the index direction and moved to the starting position for the next scan (step 360). The analysis is performed by locating all the peaks in the interferogram, determining which are zero crossing peaks, calculating the distance of all other peaks relative to the nearest zero crossing peaks, and then determining which peak distances fit within the defined acceptance ranges. In Table I the row starting with '0, # points' (where '0' represents the scan number, and '# points' refers to the number of measurements in the scan) is the header identifying the results of the first scan. The next 3 rows of data show sequential, comma-delimited measurement data for each of the defined acceptance ranges, one line or row per range. These three rows of data are $G_1$, $G_2$, $G_3$, . . . , $n_g T_1$, $ngT_2$, $ngT_3$, . . . and $F_1$, $F_2$, $F_3$, . . . respectively.

FIG. 7 shows the beginning of the raw interferometer data file covering the range of the first 6 measurements for each of the three ranges. The gap between the imager and the cover glass data $G_1$, $G_2$, and $G_3$ correspond to distances cd, de, and jk in FIG. 7 and to distances 990.343, 989.918 and 989.540 $\mu$m in Table I. The optical thickness of the cover glass $n_g T_1$, $ngT_2$, $ngT_3$ correspond to distances bd, df and ik respectively in FIG. 7 and to distances 1148.971, 1149.043 and 1149.066 $\mu$m in Table I. The distances $F_1$, $F_2$ and $F_3$ between the reference optical flat and the top of the imager cover glass correspond to distances ad, dg and hk respectively in FIG. 7 and to distances 1568.632, 1568.428 and 1568.196 $\mu$m in Table I. After all the distances have been computed and sorted based on the acceptance criteria, the scan number, starting from 0, and the total number of points in the scan, are written to the data file followed immediately by the actual measurement data. The process is repeated (steps 350-370) until the region of interest of the sample is covered in the index direction (done scanning? step 370).

After the last line is analyzed and the results stored to file, an additional line, as shown by the last line in Table I, is appended to the file indicating the maximum number of points in a scan, the # of scans and the scanning direction. Using the stored measurement information, the next step (step 380) is to calculate the parameters of interest including H the imager light receiving surface height with respect to the reference surface, the best-fit plane, the best-fit surface and the deviation from a defined surface. This is generally done with software written in a Matlab environment. After the parameters are calculated, 3-D plots of the data are generated (step 390) such as those shown in FIGS. 11–18.

TABLE I

Stored Interferometer Data File Structure

Figure 11:
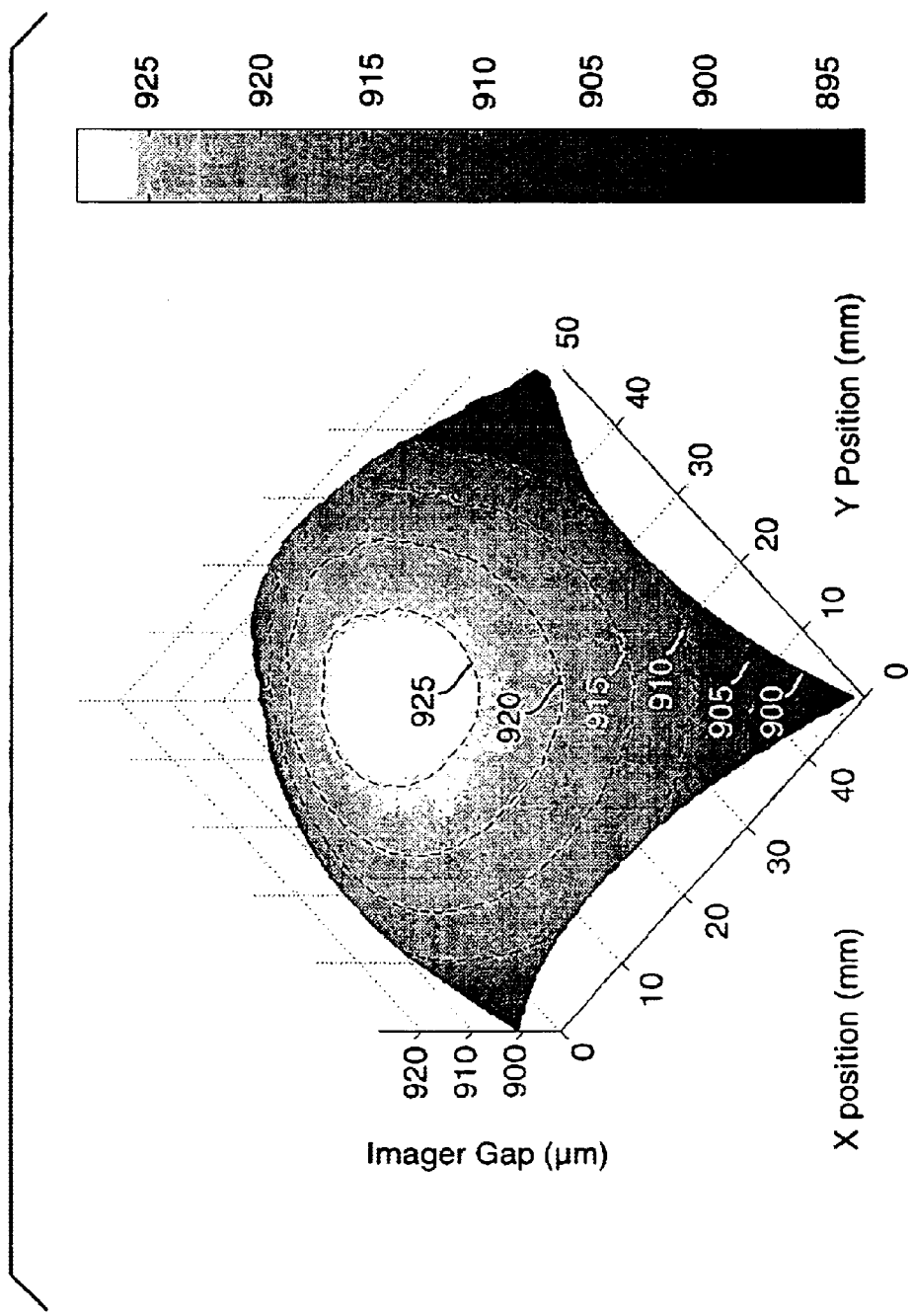
FIG. 11 is a leveled surface map of an imager glued to a package.

Sample ID and comments
Date/time
XY stage setup including scan distance for X-axis, Y-axis increment
0, # points in scan
990.343, 989.918, 989.540, 989.049, 988.691, 988.337, 987.881, 987.510, . . .
1148.971, 1149.043, 1149.066, 1149.130, 1149.125, 1149.176, 1149.199, 1149.216, . . .
1568.632, 1568.428, 1568.196, 1567.904, 1567.807, 1567.388, 1567.177, 1566.969, . . .
1, # points in scan
988.732, 988.261, 987.713, 987.254, 986.813, 986.499, 985.803, 985.496, . . .
1149.233, 1149.278, 1149.330, 1149.358, 1149.388, 1149.423, 1149.375, 1149.431, . . .
1568.934, 1568.786, 1568.610, 1568.403, 1568.318, 1568.029, 1567.862, 1567.819, . . .
. . .
max # pts per scan, # scans, scan direction FIG. 11 shows a leveled and inverted surface map of a 50 mm by 50 mm imager mounted in a package without a cover glass attached. The view of the imager surface shown in FIG. 11 is equivalent to looking down at the imager surface. The surface map of the imager obtained from the interferometric measurement data is usually inverted since the measurement is made relative to reference surface of the optical flat 21 mounted above the imager. Hence a smaller gap at a particular location indicates that the imager surface is higher at that location. Hence the surface map is inverted to depict the actual profile of the imager surface. The tilt is removed by subtracting out the best least squares fit to a plane called leveling. The vertical axis on the right shows the gray-scale shading corresponding to height in microns. The contour lines shown in FIG. 11 are at 5-micron increments. The maximum bow in this imager is 35.4 microns located near the center.

Figure 12:
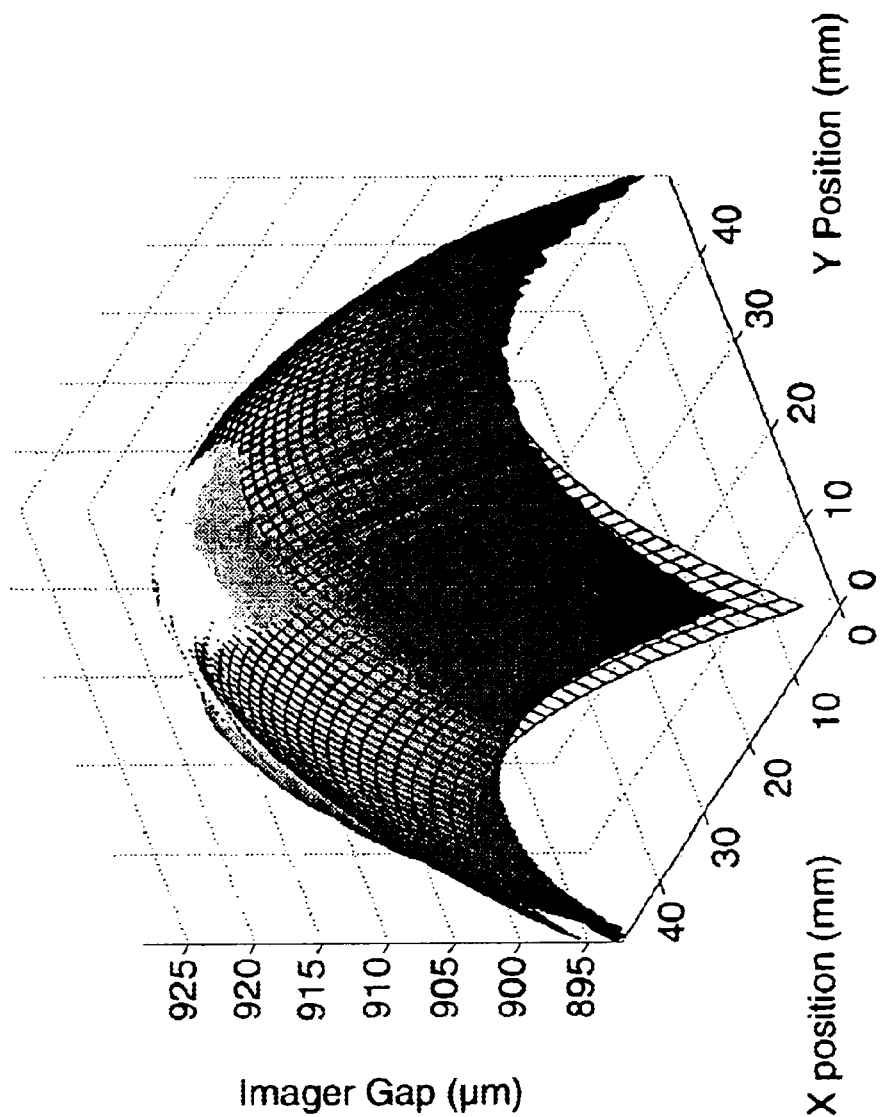
FIG. 12 is a least square sphere fit to the surface map of the packaged imager shown in FIG. 11.
Figure 13:
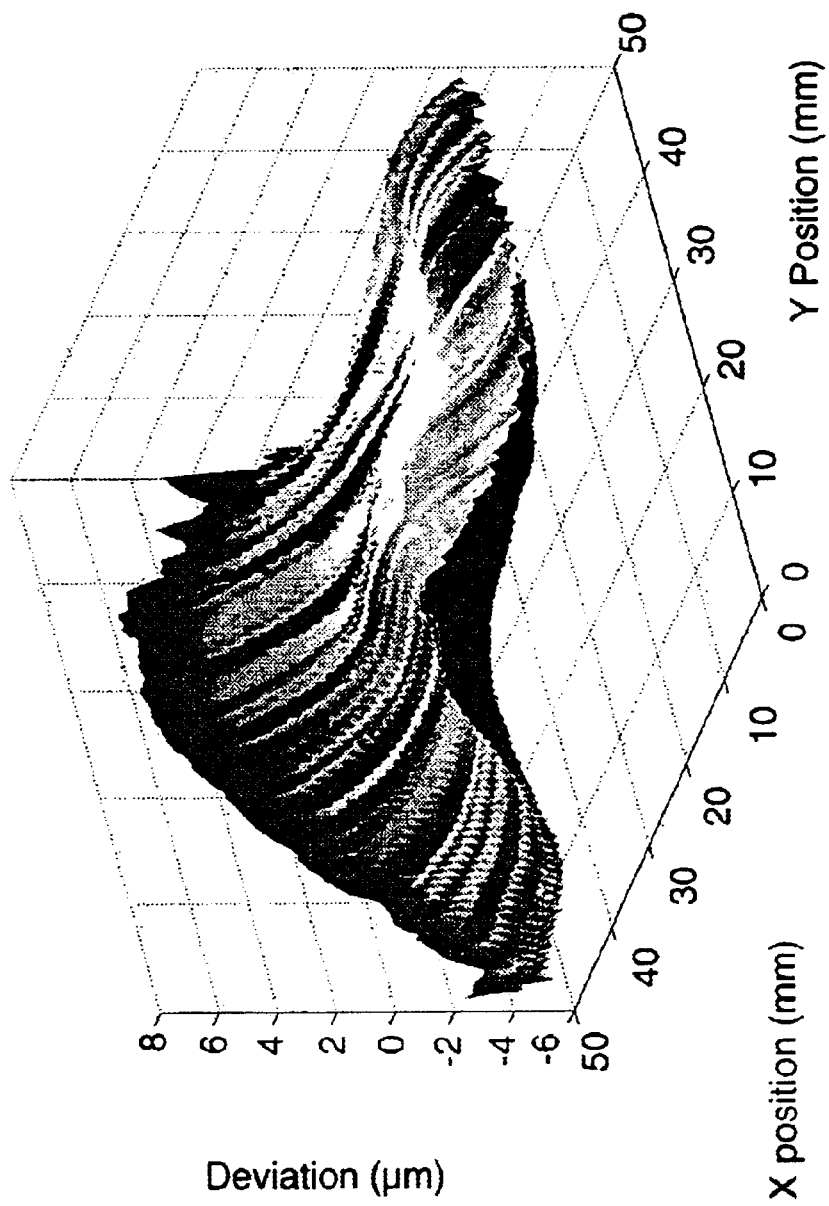
FIG. 13 is a deviation map of the imager surface shown in FIG. 11 from the spherical surface shown in FIG. 12.

A generalized polynomial fit may be performed to determine the best relationship that matches the surface. In practice it is useful to determine the best fit to a known surface. For the purpose of attaching a fiber optic faceplate to the imager, it is useful to fit it to a spherical surface. A least squares fit to a sphere has been performed as shown in FIG. 12 along with the original data. The location of the center of the best-fit sphere is located at the coordinate (24.5, 24.3, −18710.4) in mm and the radius of the sphere is 18711.3 mm. The deviation of the best-fit sphere from the original data defined as the 'actual data minus the fit data' is shown in FIG. 13. The maximum deviation from the sphere is 5.9 microns. Alternatively, the fit to the surface can be performed using other algorithms, such as the minimax algorithm.

Figure 14A:
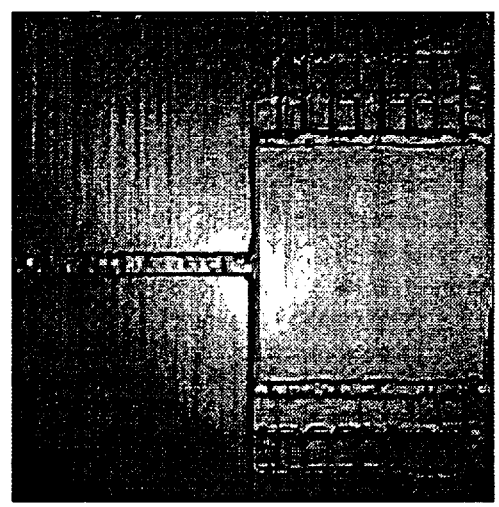
FIG. 14A is a leveled surface map of a processed wafer.
Figure 14B:
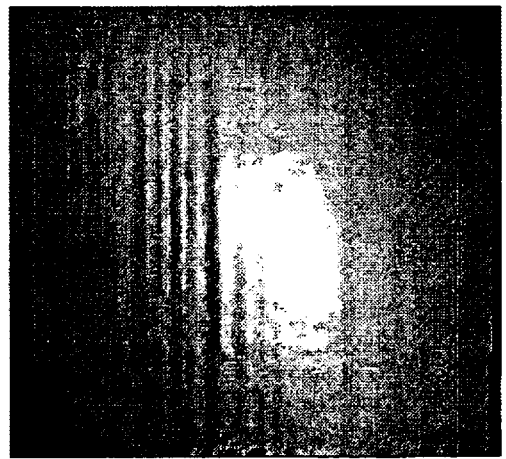
FIG. 14B is a leveled surface map of the region of the processed wafer shown in FIG. 14A defined by the 50 mm by 50 mm region outlined by the top left imager.
Figure 14C:
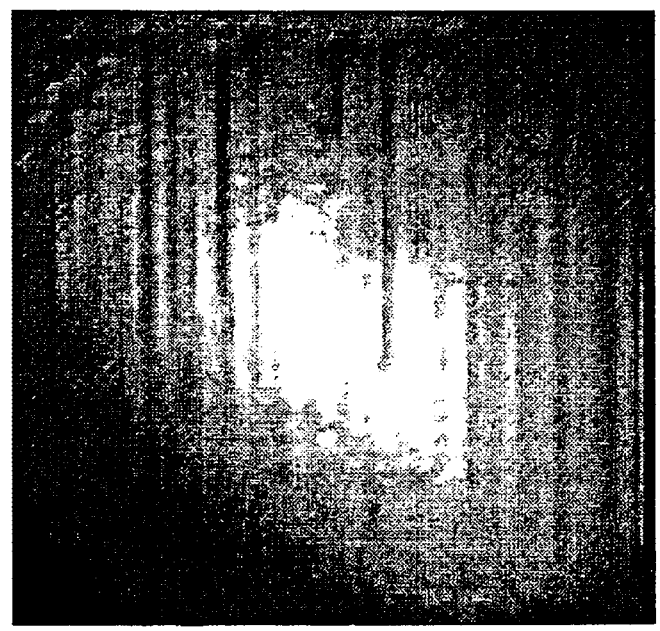
FIG. 14C is a leveled surface map of the region of the processed wafer shown in FIG. 14A defined by the 50 mm by 50 mm region outlined by the bottom left imager.
Figure 14D:
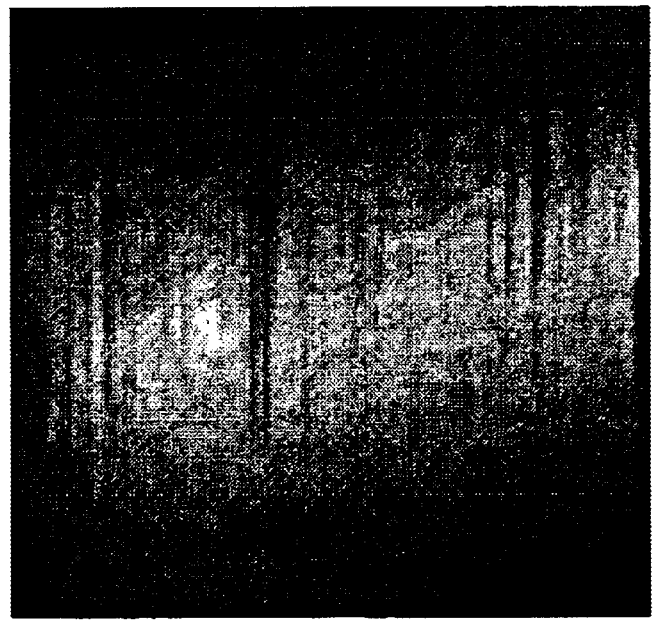
FIG. 14D is a leveled surface map of the region of the processed wafer shown in FIG. 14A defined by the 50 mm by 50 mm region outlined by the imager on the right.

FIG. 14A shows a top view of the 3 dimensional surface map of a wafer mounted into alternate base plate 120 of measurement fixture 5 during measurement. To enhance visualization of the surface features, lighting effects have been simulated to create shadows and highlights of small surface features that would otherwise be indistinguishable by eye. The vertical scale on the right indicates the approximate shading for a given height. The maximum height variation was 39.0 microns above the reference plane. FIGS. 14B, 14C and 14D show the calculated leveled surfaces of the top left 50 by 50 mm imager, the bottom left 50 by 50 mm imager and the right side 50 by 50 mm imager on the wafer respectively. Each of the individual 50 by 50 mm imager segments were located and individually leveled by subtracting the best plane fit from the raw data to derive the plotted surfaces. The imagers are then diced from the wafer using a saw and can be re-tested for flatness after dicing. Difference maps between the diced and undimmed imagers can then be used to estimate the strain deformation induced by the dicing operation.

Figure 15:
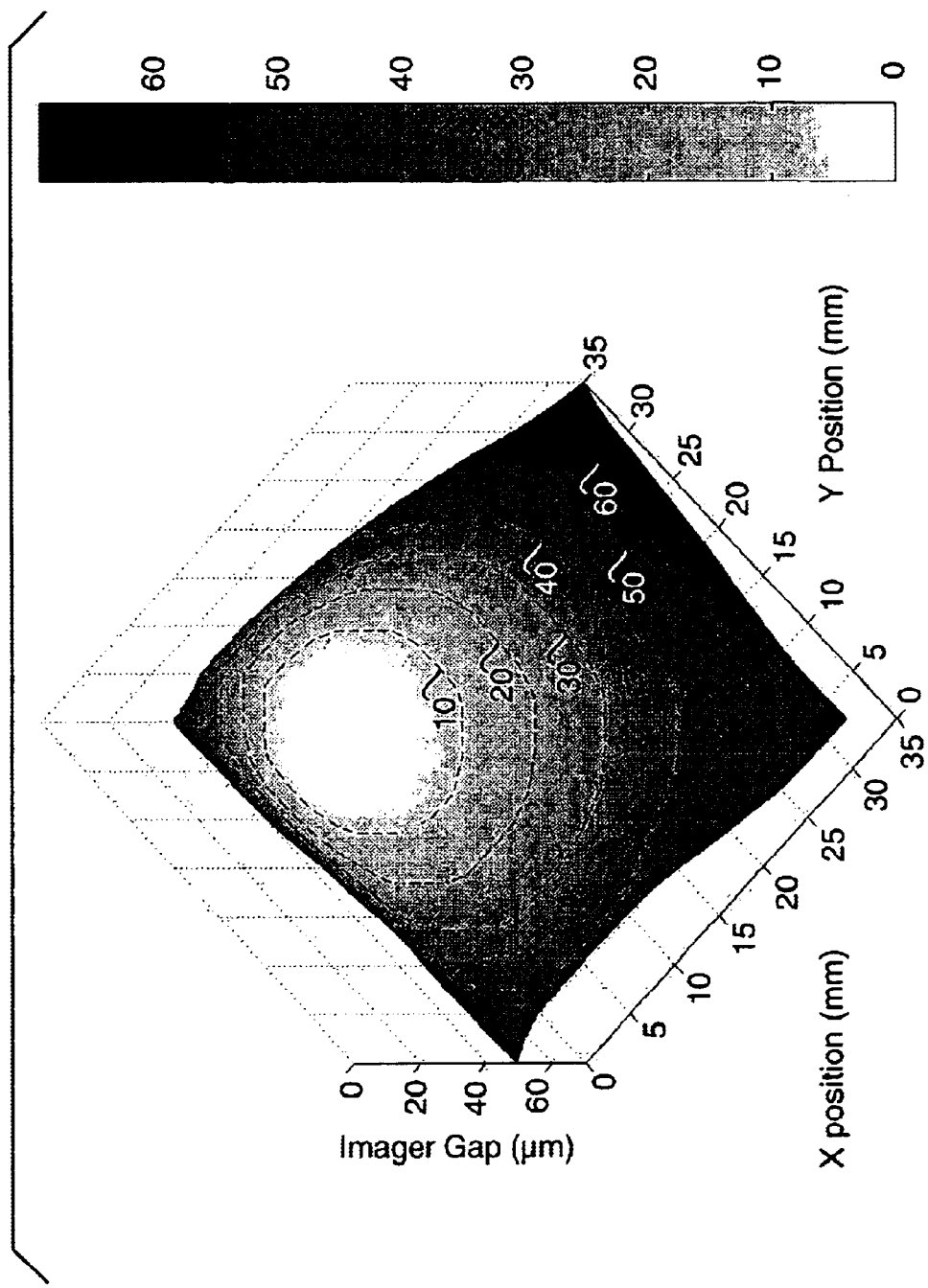
FIG. 15 is an unleveled inverted surface map of the imager gap G in a packaged imager.
Figure 16:
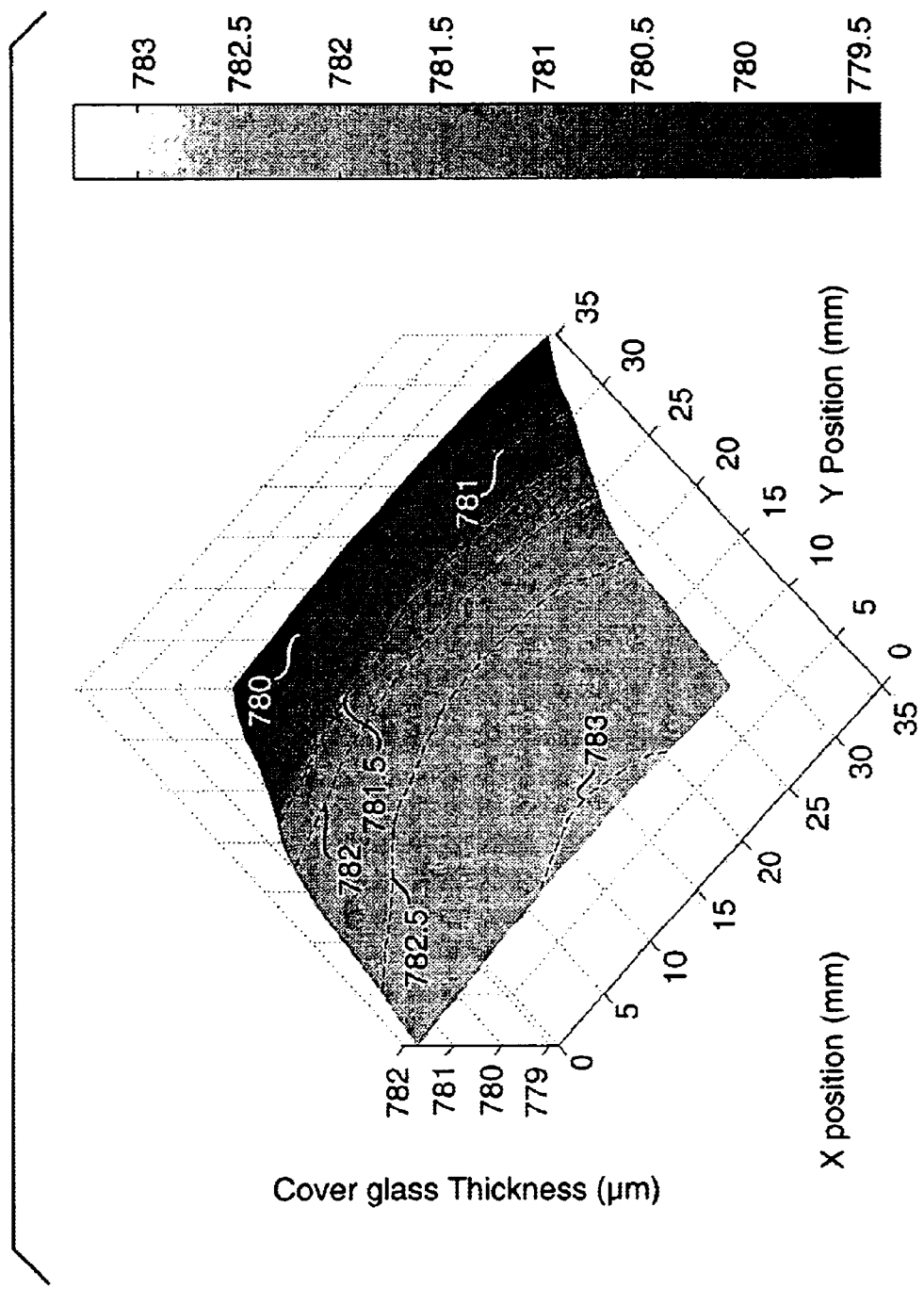
FIG. 16 is a thickness map of the cover glass for the imager shown in FIG. 15.
Figure 17:
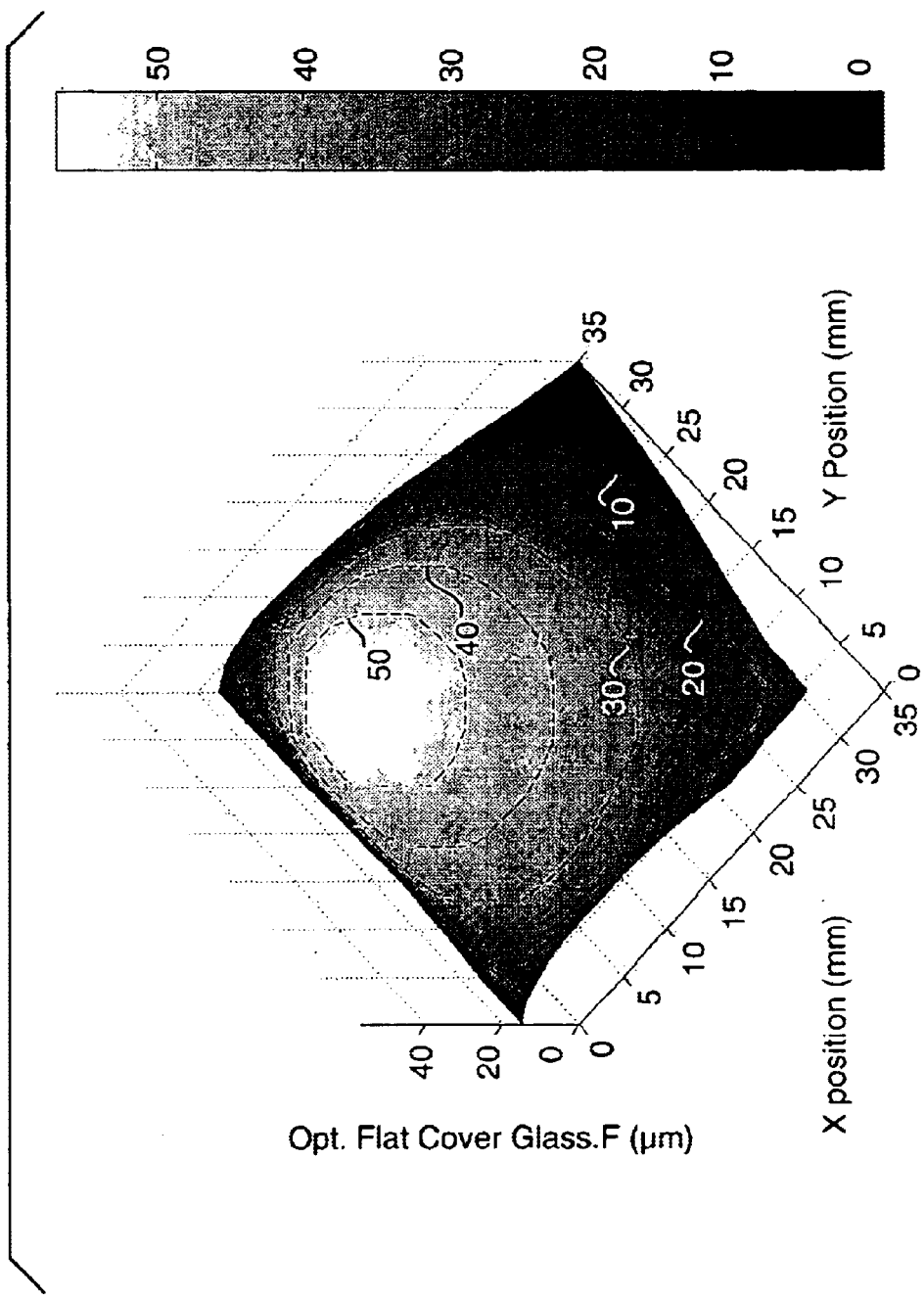
FIG. 17 is a map of the measured distance between the reference optical flat and the cover glass for the imager shown in FIGS. 15 and 16.
Figure 18:
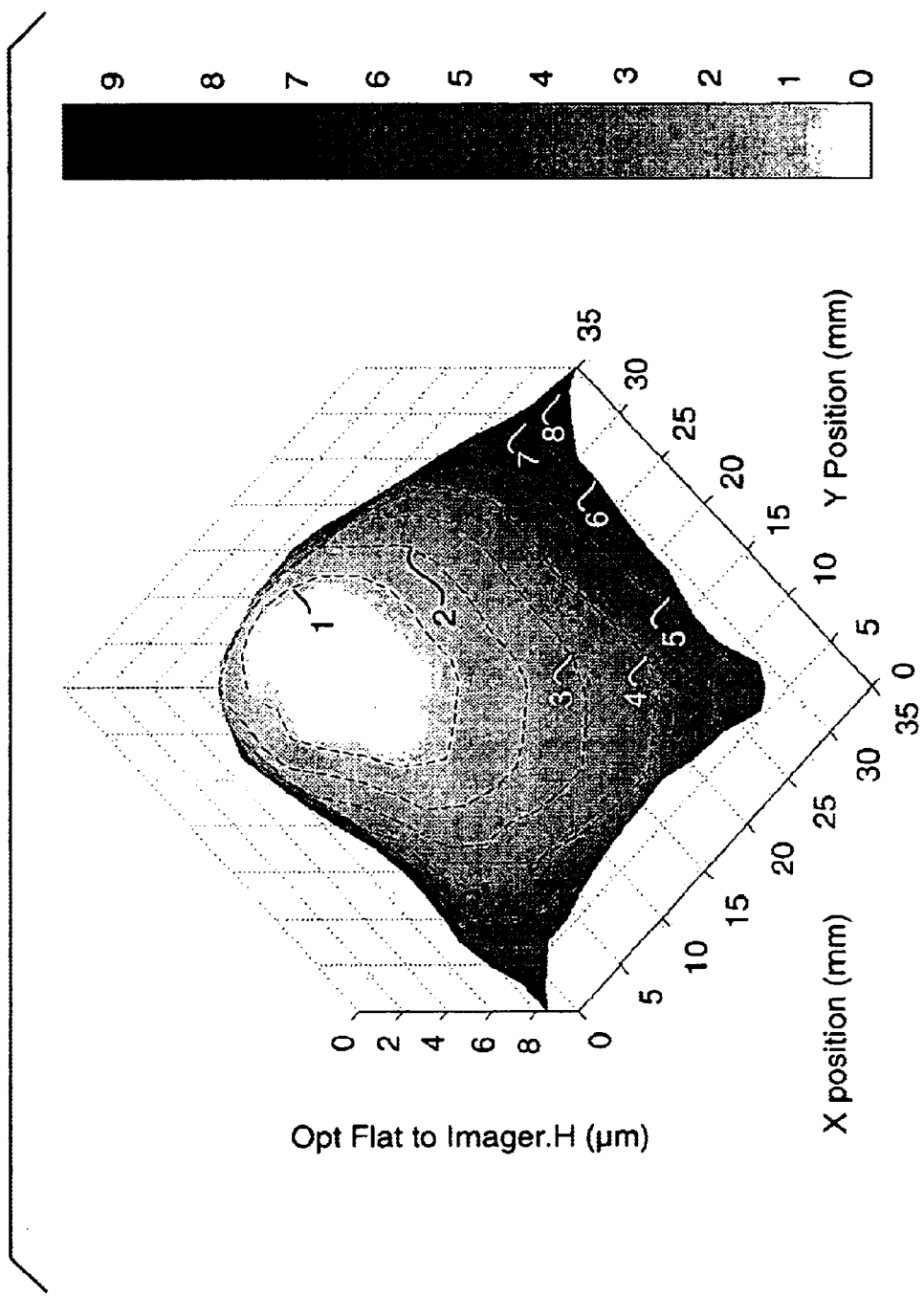
FIG. 18 is a calculated leveled surface map of the light receiving imager surface for the imager shown in FIGS. 15–17.

FIGS. 15–18 show data for an imager mounted in measurement fixture 5. The vertical scale on the right indicates the gray scale shading for various heights. All parameters shown in FIGS. 15–18 were measured simultaneously. FIG. 15 shows an inverted plot of the imager gap G. The minimum measured distance is 900.5 microns near the center and the maximum distance was 963.4 microns measured at location (35,35) mm Contour lines are shown with 10 micron increments in FIG. 15. FIG. 16 shows the thickness of the imager cover glass, as a function of position, calculated from the measured values of $n_gT$ (provided by the measurement system) divided by $n_g$ where $n_g$ equals 1.53355. The thickness of the imager cover glass varied from 778.9–782.2 microns. Contour lines are shown at 0.5-micron intervals in FIG. 16. FIG. 17 shows the measured distance F between the reference surface of the optical flat and the top surface of the imager cover glass for the same imager as shown in FIGS. 15 and 16. In this case the surface is not inverted and the maximum distance was 1618.5 microns located near the center and the minimum distance was 1561.4 microns located at the location (35,35). Contour lines are shown at 10-micron intervals in FIG. 16. FIG. 18 shows data for the calculated optical flat to imager surface distance H calculated from equation 1 using the data shown in FIGS. 15–17. The height H is inverted and the surface has been leveled with respect to the best-fit plane. The maximum deviation from flatness was measured to be 8.21 microns with the highest point near the middle of the imager surface. Contour lines are shown at 1-micron increments in FIG. 18.

Although the preferred embodiment of the present invention is described as an interferometer operating in an auto-correlation configuration, it is noted that alternative optical configurations such as a standard Michelson configuration in which the sample is placed at one of the arms of the interferometer, as described in FIG. 4 of U.S. Pat. No. 5,596,409 issued Jan. 21, 1997 to Marcus et al., can be utilized. It should also be noted that the present invention can be employed without use of the coherent light interferometer by using an alternative method for determining distance traveled by the low coherent light interferometer's scanning mechanism, for example by use of an optical encoder on a moving element.

The invention has been described in detail with particular reference to certain preferred embodiments thereof, but it will be understood that variations and modifications can be effected within the spirit and scope of the invention.

| PARTS LIST | |
|---|---|
| 5 | measurement fixture |
| 10 | base plate |
| 14 | top plate |
| 16 | adjustable height spacers |
| 17 | adjustment screws |
| 18 | alignment pins |
| 20 | optical flat |
| 21 | bottom surface of optical flat |
| 23 | top surface of optical flat |
| 30 | optical probe |
| 31 | optical probe focusing lens |
| 32 | probe optical fiber |
| 34 | probe height adjusting micrometer |
| 36 | sample under test |
| 38 | probe mount |
| 40 | imager mounting receptacle |
| 41 | imager mounting socket |
| 42 | imager lead prongs |
| 44 | wire bond |
| 45 | lead frame |
| 46 | lead frame top pad |
| 47 | lead frame conductive layer |
| 48 | lead frame bottom layer |
| 50 | digital imager |
| 51 | imager package |
| 52 | imager chip |
| 53 | imager light receiving surface |
| 54 | bottom surface of imager chip |
| 60 | imager cover glass |
| 61 | top surface of imager cover glass |
| 62 | bottom surface of imager cover glass |
| 64 | XY stage control cable |
| 66 | interferometer data acquisition and control cable |
| 70 | package substrate |
| 71 | substrate to imager chip bonding layer |
| 72 | substrate to leadframe bonding layer |
| 73 | image sensor mounting surface |
| 75 | interferometer |
| 76 | light emitting diode |
| 77 | single mode fiber |
| 78 | 1 by 2 coupler |
| 79 | single mode fiber |
| 80 | XY scanning frame |
| 81 | collimator |
| 82 | laser |
| 83 | rotating optical head |
| 84 | top beam |
| 85 | beam splitter cube |
| 86 | bottom beam |
| 87 | hollow retro-reflector |
| 88 | hollow retro-reflector |
| 89 | rotatable platform |
| 90 | motor shaft |
| 91 | DC motor drive |
| 92 | laser output beam |
| 93 | low coherence output beam |
| 94 | laser notch filter |
| 95 | bandpass filter |
| 96 | laser interference detector |
| 97 | low coherence light interference detector |
| 98 | computer |
| 99 | signal processing electronics |
| 100 | power supply |
| 101 | laser diode |
| 102 | single mode fiber |
| 103 | wavelength division multiplexer |
| 104 | single mode fiber |

-continued

PARTS LIST

| | |
|---|---|
| 105 | single mode fiber |
| 106 | 50/50 fiber coupler |
| 107 | wavelength division multiplexer |
| 108 | piezoelectric modulator |
| 109 | piezoelectric modulator |
| 110 | single mode optical fiber |
| 111 | single mode optical fiber |
| 112 | interferometer fiber |
| 113 | interferometer fiber |
| 114 | mirror |
| 115 | mirror |
| 116 | adjustable height spacer receivers |
| 118 | alignment pin receivers |
| 120 | alternate baseplate |
| 122 | shelf recess |
| 124 | optional flat surface |
| 126 | alignment keyway |
| 300 | load step |
| 310 | setup scan step |
| 320 | setup interferometer step |
| 330 | setup acceptance ranges step |
| 340 | move stage to start position step |
| 350 | perform X-scan step |
| 360 | analyze data and increment stage step |
| 370 | done scanning decision step |
| 380 | calculate parameters step |
| 390 | generate plots step |

What is claimed is:

1. Apparatus for measuring the surface profile of a sample, comprising:
  a) a fixture for locating a surface of a transparent optical flat relative to a surface of a sample;
  b) a low-coherence light interferometer having an optical probe coupled to an XY scanning frame for scanning the surface of the sample through the transparent optical flat to produce interferometric data signals representing the distances between the optical flat surface and the surface of the sample; and
  c) a computer system responsive to the interferometric data signals for generating a surface profile of the sample using a best fit to a plane.

2. The apparatus claimed in claim 1, wherein the interferometric data signals are produced at regular intervals and further comprising means for moving the XY scanning frame to scan the surface in a raster pattern and wherein, the computer is responsive to interferometric data signals produced only while the transport stage is moving at a constant velocity over the sample.

3. The apparatus claimed in claim 2, wherein the computer further comprises means for generating a mathematical model of the surface profile.

4. The apparatus claimed in claim 3, wherein the computer further comprises means for generating a deviation map of the surface profile from the mathematical model.

5. The apparatus claimed in claim 4, wherein the mathematical model is a spherical surface.

6. The apparatus claimed in claim 2, wherein the sample includes a surface and one or more transparent layers located over the surface, and wherein the low-coherence light interferometer produces signals representing the optical distances between the optical flat surface, the surface of the sample and the surfaces of the transparent layers; and the computer further comprises means for generating the surface profiles of the sample and the transparent layers from the measured optical distances.

7. The apparatus claimed in claim 6, wherein the computer further comprises means for generating mathematical models of the surface profiles.

8. The apparatus claimed in claim 7, wherein the computer further comprises means for generating deviation maps of the surface profiles from the respective mathematical models.

9. The apparatus claimed in claim 8, wherein the mathematical models are spherical surfaces.

10. The apparatus claimed in claim 6, wherein the computer further comprises means for generating distance profiles between the surface of the sample and the surfaces of the transparent layers.

11. Apparatus for measuring the mounting height variations in the surface of an image sensor as a result of mounting the image sensor in a package, comprising:
  a) a fixture for locating the image sensor in the package in a predetermined relationship to a surface of a transparent optical flat;
  b) a low-coherence light interferometer having an optical probe coupled to an XY scanning frame for scanning the surface of the image sensor through the transparent optical flat to produce interferometric data signals representing distances between the optical flat surface and the surface of the image sensor;
  c) a computer responsive to the interferometric data signals generated before and after the image sensor is mounted in the package for generating a mounting height variation map.

12. The apparatus claimed in claim 11, wherein the interferometric data signals are produced at regular intervals and further comprising means for moving the XY scanning frame to scan the surface in a raster pattern and wherein, the computer is responsive to interferometric data signals produced only while the transport stage is moving at a constant velocity over the sample.

13. The apparatus claimed in claim 12, wherein the image sensor is mounted in the package using a thermally curable adhesive, and wherein the fixture is mounted in a curing oven and the before and after measurements measure changes in the mounting height due to curing of the adhesive.

14. The apparatus claimed in claim 12, wherein the image sensor is mounted in the package using a curable adhesive, and wherein the computer generates mounting height variation maps at regular intervals throughout a curing cycle of the curable adhesive.

15. Apparatus for measuring the change in surface profile due to processing in a micro-fabrication substrate, comprising:
  a) a fixture for locating a micro-fabrication substrate in a predetermined relationship to a surface of a transparent optical flat;
  b) a low-coherence light interferometer having an optical probe coupled to an XY scanning frame for scanning the surface of the micro-fabrication substrate through the transparent optical flat to produce interferometric data signals representing distances between the optical flat surface and the surface of the micro-fabrication substrate;
  c) a computer responsive to the interferometric data signals generated before and after processing for generating a processing height variation map.

16. The apparatus claimed in claim 15, wherein the interferometric data signals are produced at regular intervals and further comprising means for moving the XY scanning frame to scan the surface in a raster pattern and wherein, the computer is responsive to interferometric data signals produced only while the transport stage is moving at a constant velocity over the micro-fabrication substrate.

17. Apparatus to determine the change in flatness of individual micro-fabricated devices formed on a wafer after dicing the wafer, comprising:
   a) a fixture for locating a micro-fabrication wafer in predetermined relationship to a surface of a transparent optical flat;
   b) a low-coherence light interferometer having an optical probe coupled to an XY scanning frame for scanning the surface of the transparent optical flat to produce interferometric data signals representing distances between the optical flat surface and the surfaces of micro-fabricated devices on the wafer,
   c) a computer responsive to the interferometric data signals generated before and after dicing the wafer for calculating a surface profile for each device on the undiced and diced wafer from the measured distances in step b using a best fit to a plane and for generating a processing height variation map for each device by taking the differences between the undiced and diced device profiles.

18. The apparatus claimed in claim 17, wherein the interferometric data signals are produced at regular intervals and further comprising means for moving the XY scanning frame to scan the surface in a raster pattern and wherein, the computer is responsive to interferometric data signals produced only while the transport stage is moving at a constant velocity over the wafer.

19. A method of measuring the surface profile of a sample, comprising the steps of:
   a) locating a surface of the sample relative to a surface of a transparent optical flat;
   b) employing a low-coherence light interferometer having an optical probe coupled to an XY scanning frame that scans the surface of the sample through the transparent optical flat to produce interferometric data signals representing the distances between the optical flat surface and the surface of the sample; and
   c) generating a surface profile of the sample from the interferometric data signals using a best fit to a plane.

20. The method claimed in claim 19, further comprising the step of moving the XY scanning frame to scan the surface in a raster pattern and producing the interferometric data signals at regular intervals and using only signals produced while the transport stage is moving at a constant velocity over the sample to generate the surface profile.

21. The method claimed in claim 20, wherein the interferometric data signals are collected during the scan of the raster pattern and are processed during the return or the XY transport stage.

22. The method claimed in claim 19, further comprising the step of generating a mathematical model of the surface profile.

23. The method claimed in claim 22, further comprising the step of generating a deviation map of the surface profile from the mathematical model.

24. The method claimed in claim 22, wherein the mathematical model is a spherical surface.

25. The method claimed in claim 20, wherein the sample includes a surface and one or more transparent layers located over the surface, and further comprising the steps of employing the low-coherence light interferometer to measure the optical distances between the optical flat surface, the surface of the sample and the surfaces of the transparent layers; and generating the surface profiles of the sample and the transparent layers from the measured optical distances.

26. The method claimed in claim 25, wherein the interferometric data signals are collected during the scan of the raster pattern and are processed during the return or the XY transport stage.

27. The method claimed in claim 25, further comprising the step of generating mathematical models of the surface profile of the sample and the transparent layers.

28. The method claimed in claim 27, further comprising the step of generating a deviation map of the surface profiles of the sample and the transparent layers from the mathematical models.

29. The method claimed in claim 27, wherein the mathematical models are spherical surfaces.

30. The method claimed in claim 25, further comprising the step of generating distance profiles between the surface of the sample and the surfaces of the transparent layers from the measured optical distances.

31. The method claimed in claim 20, wherein the sample is an image sensor, and the sample surface is a light-receiving surface of the image sensor.

32. The method claimed in claim 20, wherein the sample is a packaged imager including an image sensor and a cover glass, the surface of the sample being a light receiving surface of the image sensor.

33. The method claimed in claim 20, wherein the sample is an image sensor package, and the surface of the sample being an image sensor-mounting surface.

34. The method claimed in claim 20, wherein the sample is a micro-fabrication substrate.

35. A method of measuring the mounting height variations in the surface of an image sensor as a result of mounting the image sensor in a package, comprising the steps of:
   a) locating the image sensor in the package prior to mounting and placing the packaged image sensor in a predetermined relationship to a surface of a transparent optical flat;
   b) employing a low-coherence light interferometer having an optical probe coupled to an XY scanning frame that scans the surface of the image sensor through the transparent optical flat to measure distances between the optical flat surface and the surface of the image sensor;
   c) mounting the image sensor in the package;
   d) relocating the packaged image sensor in the predetermined relationship to the surface of the transparent optical flat;
   e) employing the low-coherence light interferometer to measure distances between the optical flat surface and the surface of the mounted image sensor; and
   f) generating a mounting height variation map by taking the differences between the distances measured in steps e and b.

36. The method claimed in claim 35, further comprising the step of moving the XY scanning frame to scan the surface in a raster pattern and measuring the distances at regular intervals only while the transport stage is moving at a constant velocity over the sample to generate the mounting height variation map.

37. The method claimed in claim 36, wherein the image sensor is mounted in the package using a curable adhesive, and further comprising the step of employing the low-coherence interferometer to measure changes in the mounting height due to curing of the adhesive.

38. A method of measuring the change in surface profile due to processing in a micro-fabrication substrate, comprising the steps of:
   a) locating an unprocessed micro-fabrication substrate in predetermined relationship to a surface of a transparent optical flat;

b) employing a low-coherence light interferometer having an optical probe mounted on an XY scanning frame for scanning the surface of the substrate through the transparent optical flat to measure distances between the optical flat surface and the surface of the micro-fabrication substrate;

c) processing the micro-fabrication substrate;

d) relocating the processed substrate in the predetermined relationship to the surface of the transparent optical flat;

e) employing the low-coherence light interferometer to measure distances between the optical flat surface and the surface of the processed substrate; and f) generating a processing height variation map by taking the differences between the distances measured in steps e and b.

39. The method claimed in claim 38, further comprising the step of moving the XY scanning frame to scan the surface in a raster pattern and measuring the distances at regular intervals only while the transport stage is moving at a constant velocity over the substrate to generate the processing height variation map.

40. A method of determining the change in flatness of individual micro-fabricated devices formed on a wafer after dicing the wafer, comprising the steps of:

a) locating a processed undiced micro-fabrication wafer in predetermined relationship to a surface of a transparent optical flat;

b) employing a low-coherence light interferometer having an optical probe mounted in an XY scanning frame for scanning the surface of the transparent optical flat to measure distances between the optical flat surface and the surfaces of the micro-fabricated devices on the undiced wafer;

c) calculating a surface profile for each device on the undiced wafer from the measured distances in step b using a best fit to a plane;

d) dicing the micro-fabrication wafer;

e) locating a diced wafer in the predetermined relationship to the surface of the transparent optical flat;

f) employing the low-coherence light interferometer to measure distances between the optical flat surface and the surface of the devices in the diced wafer;

g) calculating a surface profile for each device n the diced wafer from the measured distances in step f using a best fit to a plane; and h) generating a processing height variation map for each device by taking the differences between the device profiles calculated in steps c and g.

41. The method claimed in claim 40, further comprising the step of moving the XY scanning frame to scan the surface in a raster pattern and measuring the distances at regular intervals only while the transport stage is moving at a constant velocity over the sample to generate the processing height variation map.

* * * * *